US009025861B2

(12) United States Patent
Furukawa et al.

(10) Patent No.: US 9,025,861 B2
(45) Date of Patent: May 5, 2015

(54) SYSTEM AND METHOD FOR FLOORPLAN RECONSTRUCTION AND THREE-DIMENSIONAL MODELING

(71) Applicant: Google Inc., Mountain View, CA (US)

(72) Inventors: Yasutaka Furukawa, Bellevue, WA (US); Ricardo de Silveira Cabral, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 13/874,828

(22) Filed: May 1, 2013

(65) Prior Publication Data
US 2014/0301633 A1    Oct. 9, 2014

Related U.S. Application Data

(60) Provisional application No. 61/810,035, filed on Apr. 9, 2013.

(51) Int. Cl.
*G06K 9/00*    (2006.01)
*G06K 9/36*    (2006.01)
*G06T 17/00*   (2006.01)

(52) U.S. Cl.
CPC ............. *G06T 17/00* (2013.01); *G06T 2210/04* (2013.01); *G06T 2210/56* (2013.01)

(58) Field of Classification Search
None
See application file for complete search history.

(56) References Cited

U.S. PATENT DOCUMENTS

| 6,420,698 | B1* | 7/2002 | Dimsdale | 250/234 |
| 7,728,833 | B2* | 6/2010 | Verma et al. | 345/420 |
| 8,248,405 | B1* | 8/2012 | O'Donnell | 345/419 |
| 8,705,893 | B1* | 4/2014 | Zhang et al. | 382/285 |
| 2003/0152897 | A1* | 8/2003 | Geiger | 434/262 |
| 2009/0244309 | A1* | 10/2009 | Maison et al. | 348/222.1 |
| 2013/0314688 | A1* | 11/2013 | Likholyot | 356/3.1 |

OTHER PUBLICATIONS

EM Arkin, JSB Mitchell, and CD Piatko, "Minimum-Link Watchman Tours," Inf. Process. Lett. 86, 203-207 (2003).*
Brian E. Okorn, Xuehan Xiong, Burcu Akinci, and Daniel Huber, "Toward Automated Modeling of Floor Plans," Proceedings of the Symposium on 3D Data Processing, Visualization and Transmission. May 2010.*

(Continued)

*Primary Examiner* — Michael A Newman
*Assistant Examiner* — Soo Shin
(74) *Attorney, Agent, or Firm* — Dority & Manning, P.A.

(57) ABSTRACT

Systems and methods for reconstructing a floorplan of a building for generating a three-dimensional model are provided. One aspect of the present disclosure is directed to a computer-implemented method for generating a three-dimensional model of a building. The method includes estimating a floor height and a ceiling height of the building. The method also includes identifying a core region of a two-dimensional graph, the core region corresponding to an interior of the building. The method includes determining a solution path that circumnavigates the core region and minimizes a cost formula, the cost formula providing an edge cost for each of a plurality of edges. The method further includes generating a three-dimensional model of the interior of the building based on the floor height, the ceiling height, and the solution path.

25 Claims, 12 Drawing Sheets

(56) References Cited

OTHER PUBLICATIONS

Richard A. Newcombe, Shahram Izadi, Otmar Hilliges, David Molyneaux, David Kim, Andrew J. Davison, Pushmeet Kohli, Jamie Shotton, Steve Hodges, and Andrew Fitzgibbon, "KinectFusion: Real-Time Dense Surface Mapping and Tracking", Mixed and Augmented Reality (ISMAR), 2011 10th IEEE International Symposium on, Oct. 2011.*

Pei-Ning Guo, Toshihiko Takahashi, Chung-Kuan Cheng, and Takeshi Yoshimura, "Floorplanning Using a Tree Representation," IEEE Transactions on Computer-Aided Design of Integrated Circuits and Systems, vol. 20, No. 2, pp. 281-289. Feb. 2001.*

Yasataka Furukawa and Jean Ponce, "Accurate, Dense, and Robust Multiview Stereopsis," IEEE Transactions on Pattern Analysis and Machine Intelligence, vol. 32, No. 8, Aug. 2010.*

Abraham et al., "Highway Dimension, Shortest Paths, and Provably Efficient Algorithms", Association for Computing Machinery and Society for Industrial and Applied Mathematics Symposium on Discrete Algorithms, Austin, Texas, Jan. 17-19, 2010, 12 pages.

Agarwal et al., "Building Rome in a Day", Communications of the Association for Computing Machinery, vol. 54, No. 10, Oct. 2011, pp. 105-112.

Bao et al., "Semantic Structure from Motion with Points, Regions and Objects", Proceedings of the IEEE International Conference on Computer Vision and Pattern Recognition, Providence, Rhode Island, Jun. 16-21, 2012, 8 pages.

Belton et al. "Automated Matching of Segmented Point Clouds to As-Built Plans", Proceedings of the Surveying Spatial Sciences Biennial Conference, Wellington, New Zealand, Nov. 21-25, 2011, 14 pages.

Boykov et al., "Fast Approximate Energy Minimization via Graph Cuts", IEEE Transactions on Pattern Analysis and Machine Intelligence, Nov. 2001, vol. 23, No. 11, pp. 1222-1239.

Budroni et al., "Toward Automatic Reconstruction of Interiors from Laser Data", In Proceedings of 3D—ARCH, Mestre-Venice, Italy, Aug. 22-24, 2005, 7 pages.

Chauve et al., "Robust Piecewise-Planar 3D Reconstruction and Completion from Large-Scale Unstructured Point Data", IEE Conference on Computer Vision and Pattern Recognition, Paris, France, Jun. 13-18, 2010, 8 pages.

Cunha et al., "Using a Depth Camera for Indoor Robot Localization and Navigation", Robotics Science and Systems 2011 Workshop on Advanced Reasoning with Depth Cameras, Los Angeles, California, Jul. 2011, 6 pages.

Delage et al., A Dynamic Bayesian Network Model for Autonomous 3D Reconstruction from a Single Indoor Image, IEEE Computer Society Conference on Computer Vision and Pattern Recognition, New York, NY, Jun. 17-22, 2006, pp. 2418-2428.

Delong et al., "Globally Optimal Segmentation of Multi-Region Objects", In International Conference on Computer Vision, Kyoto, Japan, Sep. 27-Oct. 4, 2009, 8 pages.

Felzenszwalb et al., "Efficient Graph-Based Image Segmentation", International Journal of Computer Vision, 2004, vol. 59, No. 2, pp. 167-181.

Flint et al., "A Dynamic Programming Approach to Reconstructing Building Interiors", Proceedings of European Conference on Computer Vision, Crete, Greece, Sep. 5-11, 2010, 14 pages.

Flint et al., "Manhattan Scene Understanding Using Monocular, Stereo and 3D Features", IEEE International Conference on Computer Vision, Barcelona, Spain, Nov. 6-13, 2011, 8 pages.

Furukawa et al., "Accurate, Dense, and Robust Multi-View Stereopsis", IEEE Transactions on Pattern Analysis and Machine Intelligence, vol. 32, No. 8, 2010, pp. 1362-1376.

Furukawa et al., "High-Fidelity Image-Based Modeling", Technical Report 2006-02, UIUC, May 2006, 10 pages.

Furukawa et al., "Manhattan-World Stereo", IEEE Computer Society Conference on Computer Vision and Pattern Recognition, Miami Beach, Florida, Jun. 20-25, 2009, 8 pages.

Furukawa et al., "Reconstructing Building Interiors from Images", International Conference on Computer Vision, Kyoto, Japan, Sep. 27-Oct. 4, 2009, 8 pages.

Furukawa et al., "Towards Internet Scale Multi-View Stereo", IEEE Conference on Computer Vision and Pattern Recognition, San Francisco, California, Jun. 13-18, 2010, 8 pages.

Hedau et al., "Recovering the Spatial Layout of Cluttered Rooms", $12^{th}$ IEEE International Conference on Computer Vision, Kyoto, Japan, Sep. 27-Oct. 4, 2009, 8 pages.

Hoiem et al., "Geometric Context from a Single Image", $10^{th}$ IEEE International Conference on Computer Vision, Beijing, China, Oct. 17-20, 2005, 8 pages.

Izadi et al., "KinectFusion: Real-Time 3D Reconstruction and Interaction Using a Moving Depth Camera", User Interface Software and Technology, Santa Barbara, California, Oct. 16-19, 2011, 10 pages.

Kim et al., "Interactive Acquisition of Residential Floor Plans", IEEE International Conference on Robotics and Automation (ICRA), St. Paul, Minnesota, May 14-18, 2012, 8 pages.

Kolmogorov et al., "What Energy Functions can be Minimized via Graph Cuts", IEEE Transactions on Pattern Analysis and Machine Intelligence, vol. 26, No. 2, Feb. 2004, pp. 147-159.

Lee et al., "Geometric Reasoning for Single Image Structure Recovery", IEEE Conference on Computer Vision and Pattern Recognition, Miami, Florida, Jun. 20-25, 2009, 8 pages.

Nicolls et al., Discrete Minimum Ratio Curves and Surfaces, IEEE Conference on Computer Vision and Pattern Recognition, San Francisco, California, Jun. 13-18, 2010, 8 pages.

Okorn et al., "Toward Automated Modeling of Floor Plans", In Proceedings of 3D Data Processing, Visualization and Transmission, Paris, France, May 17-20, 2010, 8 pages.

Ruther et al., "From Point Cloud to Textured Model, the Zamani Laser Scanning Pipeline in Heritage Documentation", South African Journal of Geomatics, vol. 1, No. 1, Jan. 2012, pp. 44-59.

Seitz et al., "A Comparison and Evaluation of Multi-View Stereo Reconstruction Algorithms", IEEE Computer Society Conference on Computer Vision and Pattern Recognition, New York, New York, Jun. 17-22, 2006, 8 pages.

Seitz et al., "Photorealistic Scene Reconstruction by Voxel Coloring", Conference on Computer Vision and Pattern Recognition, San Juan, Puerto Rico, Jun. 17-19, 1997, pp. 1067-1073.

Shotton et al., "TextonBoost for Image Understanding: Multi-Class Object Recognition and Segmentation by Jointly Modeling Texture, Layout, and Context", International Journal of Computer Vision, Jan. 2009, vol. 81, No. 1, pp. 2-23.

Sinha et al., "Interactive 3D Architectural Modeling from Unordered Photo Collections", Proceedings of ACM SIGGRAPH Asia 2008, Los Angeles, California, Aug. 11-15, 2008, 10 pages.

Szeliski et al., "A Comparative Study of Energy Minimization Methods for Markov Random Fields with Smoothness-Based Priors", IEEE Transactions on Pattern Analysis and Machine Intelligence, Jun. 2008, vol. 30, No. 6, pp. 1068-1080.

Tola et al., "Efficient Large-Scale Multi-View Stereo for Ultra High-Resolution Image Sets", Machine Vision and Applications, Sep. 2010, vol. 23, No. 5, pp. 903-920.

Turner et al., "Watertight As-Built Architectural Floor Plans Generated from Laser Range Data", Second International Conference on 3D Imaging, Modeling, Processing, Visualization and Transmission (3DIMPVT), Ottawa, Canada, Oct. 13-15, 2012, pp. 316-323.

Vogiatzis et al., "Multi-View Stereo via Volumetric Graph-Cuts and Occlusion Robust Photo-Consistency", IEEE Trans Pattern Anal Mach Intell, 2007, vol. 29, No. 12, pp. 2241-2246.

Vu et al., "High Accuracy and Visibility-Consistent Dense Multiview Stereo", IEEE Transactions on Pattern Analysis and Machine Intelligence, May 2012, vol. 34, No. 5, pp. 889-901.

Xi et al., "Virtual Navigation of Interior Structures by Lidar", Proceedings of SPIE, vol. 8037, Laser Radar Technology and Applications XVI, Orlando, Florida, Apr. 25, 2011.

Xiao et al., "Reconstructing the World's Museums", European Conference on Computer Vision, Firenze, Italy, Oct. 7-13, 2012, 14 pages.

Xiong et al., "Using Context to Create Semantic 3D Models of Indoor Environments", British Machine Vision Conference, Aberystwyth, Wales, Aug. 31-Sep. 3, 2010, 11 pages.

Zhang et al., "Free-Shape Subwindow Search for Object Localization", Conference on Computer Vision and Pattern Recognition, San Francisco, California, Jun. 13-18, 2010, 9 pages.

(56) References Cited

OTHER PUBLICATIONS

Zhou et al., "Factorized Graph Matching", Conference on Computer Vision and Pattern Recognition, Providence, Rhode Island, Jun. 16-21, 2012, 8 pages.

www2.hawaii.edu/~suthers/courses/ics311f12/Notes/Topic-19. html—9 pages.
http://stackoverflow.com/questions/9996808/a-shortest-path-algorithm-with-minimum-number-of-nodes-traversed#—3 pages.

\* cited by examiner

SYSTEM AND METHOD FOR FLOORPLAN RECONSTRUCTION AND THREE-DIMENSIONAL MODELING

FIELD

The present disclosure relates generally to three-dimensional modeling. In particular, the present disclosure relates to systems and methods for reconstructing a floorplan of a building for generating a three-dimensional model.

BACKGROUND

The reconstruction of accurate three-dimensional models from images has been an area of computer vision research that has experienced significant advances in the last several years. For example, several three-dimensional reconstruction methods have been disclosed that are superior to the use of basic laser ranging systems and are much cheaper to implement.

The photorealistic reconstructions yielded by such three-dimensional modeling techniques have enhanced a large number of applications in many areas, ranging from architecture to visual effects. Such methods can also complement photorealistic accuracy with scalability, enabling large-scale reconstructions for a number of applications.

However, notwithstanding this marked progress, most of the recent work in the image reconstruction field has focused on outdoor scenes. Therefore, recovering an accurate three-dimensional model of an indoor location remains a challenging problem.

For example, indoor scenes exhibit severe illumination variability, large untextured areas, and wide baselines. Therefore, point matching and camera calibration become easily prone to errors, thus leading to poor reconstructions.

Floorplan reconstructions, in particular, exhibit additional difficulties. For example, indoor environments often contain clutter, such as lamps, desks, chairs, etc., that serve to hide the architectural lines of the room. Furthermore, reconstructing a floorplan from datasets that include large degrees of variability and ambiguity (i.e. noisy data), which is the result of most common data capturing methods, is an inherently difficult problem.

In particular, the floorplans resulting from certain methods may not reflect the relative simplicity of a floorplan when confronted with noisy data. For example, certain methods can overfit a given dataset and can result in a floorplan that is overly complex and contains many deviations from a typical rectilinear floorplan. In addition, extraneous items, such as data reflecting items captured through windows or glass doors, can be captured in the floorplan. Such deviations are often incorrect, unwanted, and cause additional difficulty when using a three-dimensional model based on the determined floorplan by, for example, stitching or texture mapping panoramic images according to the floorplan.

Other methods can confront the problem of floorplan reconstruction by treating it as a volumetric segmentation procedure in which each voxel is categorized as either indoor or outdoor. However, such methods often exhibit shrinkage bias. Therefore, thin indoor walls that separate contiguous rooms may fail to be recovered. Further, regularization terms often lead to problems including difficulty with local minima, thus rendering the methods sensitive to initialization problems.

Therefore, improved systems and methods for floorplan reconstruction and visualization are desirable.

SUMMARY

Aspects and advantages of the invention will be set forth in part in the following description, or may be obvious from the description, or may be learned through practice of the invention.

One aspect of the present disclosure is directed to a computer-implemented method for generating a three-dimensional model of a building. The method includes estimating a floor height and a ceiling height of the building. The method also includes identifying a core region of a two-dimensional graph. The core region corresponds to an interior of the building. The method includes determining a solution path that circumnavigates the core region and minimizes a cost formula, the cost formula providing an edge cost for each of a plurality of edges. The method further includes generating a three-dimensional model of the interior of the building based on the floor height, the ceiling height, and the solution path.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
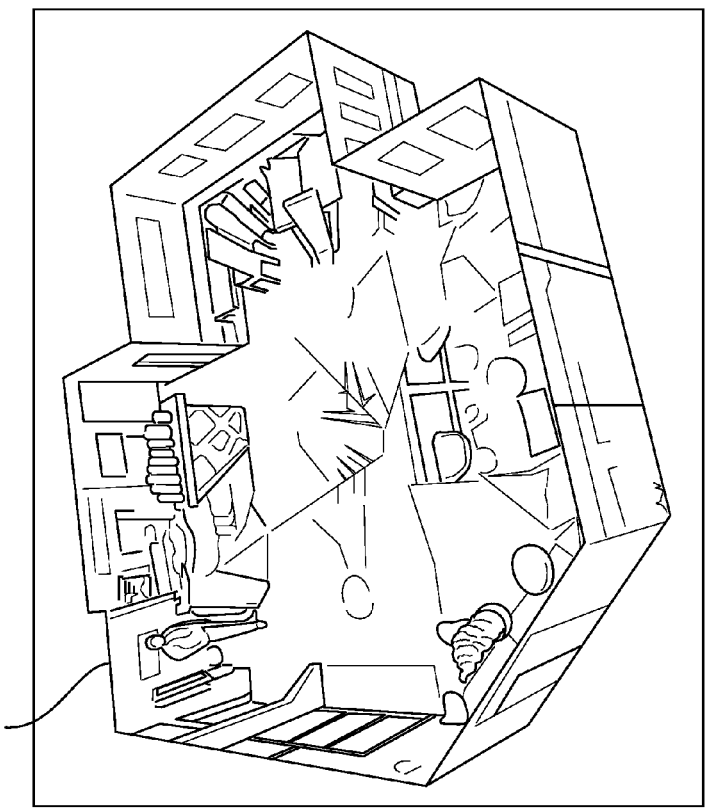
FIG. 1 depicts exemplary panoramic images and an exemplary three-dimensional model according to an exemplary embodiment of the present disclosure.
Figure 1:
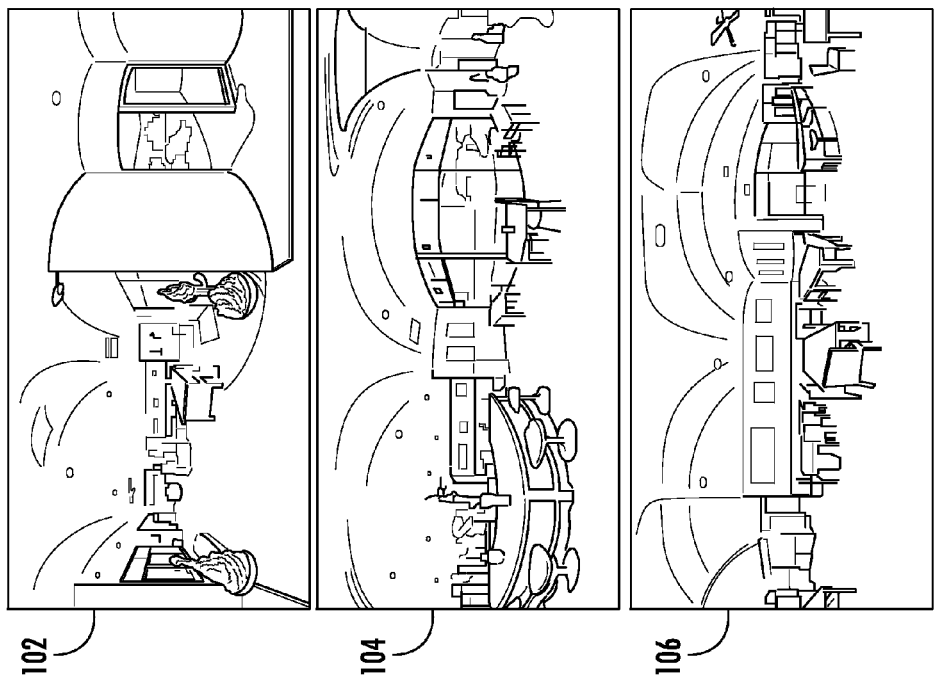

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to a method for constructing a three-dimensional model of the interior of a building (e.g. a restaurant, café, etc.) from a collection of data, such as a set of panoramic images. The method generally works in two phases. First, the floor and ceiling heights are estimated from a three-dimensional point cloud obtained from the data. As an example, a multi-view stereo algorithm can be used to generate the three-dimensional point cloud from panoramic images. Second, the three-dimensional point cloud is filtered and converted into a specially crafted two-dimensional graph and the floorplan problem is formulated and solved in the style of a shortest path problem. In particular, the solution minimizes a cost formula that incentivizes solutions that use fewer edges while traversing paths associated with high densities of evidence. The resulting shortest path (floorplan) can then be extruded to the floor and ceiling heights to generate the three-dimensional model. Panoramic images can be texture mapped to the three-dimensional model in order to provide a photorealistic three-dimensional model of the interior of the building.

Using a multi-view stereo algorithm, a three-dimensional point cloud can be generated from a set of panoramic images. For example, PMVS ("Patch-based Multi-view Stereo") is a multi-view stereo algorithm created by the named inventor Yasutaka Furukawa which outputs a set of three-dimensional points which reconstruct a scene represented by the input panoramic images.

In particular, PMVS outputs a dense set of small rectangular patches covering the surfaces visible in the images. Each rectangular patch further includes a normal which provides an estimated orientation of such patch and a confidence value that corresponds to the number of unique images in which the patch was located. While an MVS algorithm can be used to obtain the three-dimensional point cloud, other techniques, such as laser scanning or other depth sensors, can also be used to obtain the three-dimensional point cloud and implement the present disclosure, as will be discussed further below.

Next, a floor and ceiling height are estimated from the three-dimensional point cloud. In one implementation, the floor and ceiling estimation is performed by sweeping a horizontal plane through the three-dimensional point cloud and counting, for each horizontal volume slice, the number of associated points located in such slice. The average of the non-zero counts can be computed. The floor plane can be determined to be the bottom-most slice with a count greater than the computed average and the ceiling plane can be the top-most slice with a count greater than the computed average.

In another implementation, the three-dimensional point cloud is filtered based on normal direction such that floor plane determination is performed with respect to only those points or patches that have a normal pointing generally upwards while the ceiling determination is performed with respect to only those points or patches that have a normal pointing generally downwards. The confidence values of the points can also be used to weight the determinations or implement pre-filtering.

In yet another implementation, floor and ceiling heights are estimated without regard to the three-dimensional point cloud. In particular, a horizontal plane can be swept through three-dimensional space. At each height the panoramic images can be projected on to the horizontal plane and the consistency of multiple projected textures where they overlap can be computed. The floor and ceiling heights can be horizontal planes where the amount of consistency is at a maximum.

After the floor and ceiling heights have been estimated, the three-dimensional point cloud can be filtered and transformed into a two-dimensional solution space. For example, the z-axis (vertical) component of each point within the three-dimensional point cloud can be ignored or otherwise not considered such that the two-dimensional solution space reflects only the x-axis and y-axis information provided by the point cloud (i.e. a "top-down" view). In other words, the three-dimensional point cloud can be projected onto a horizontal plane in order to generate the two-dimensional solution space.

Generally, the two-dimensional solution space is comprised of a plurality of pixels of a suitable resolution and each pixel has an associated evidence value describing an amount of evidence with respect to the existence of a wall at the three-dimensional location corresponding to such pixel. As an example, the evidence value for each pixel of the two-dimensional solution space can equal the number of points projected onto or otherwise associated with such pixel. As another example, the evidence value for each pixel can equal the sum of the confidence values associated with each point associated with such pixel.

The two-dimensional solution space can be used to generate a free-space evidence map. In particular, the optical center (e.g. camera location) associated with each panoramic image can be known. As such, each point or patch determined by the MVS algorithm represents evidence that that the space between such point and the optical center of the panorama used to determine such point is included within the interior building space. Such "free-space evidence" can be accumulated or aggregated for all points and associated panoramas and a free-evidence map can be generated. Thus, each pixel within the two-dimensional solution space can have a free-space value reflecting the amount of free-space evidence accumulated for such pixel location. A threshold can be applied to the free-space map to create an interior area of very high confidence, also known as a "core region."

Next, a two-dimensional graph can be generated from the two-dimensional solution space. In particular, each pixel of the two-dimensional solution space can be treated as a node of the two-dimensional graph. A plurality of edges can connect the nodes of the two-dimensional graph.

Importantly, the plurality of edges included in the two-dimensional graph are not limited to edges that connect adjacent nodes, but instead can include all edges connecting any two nodes of the graph so long as such edge does not cross the core region. Thus, edges of greater distance ("long jumps") can be used and are likely preferred, as will be discussed further below.

Using the two-dimensional graph, the floorplan reconstruction problem can be formulated as a shortest path problem. First, a node associated with large amounts of evidence (i.e. a high evidence value) can be chosen as the initial anchor node. The problem is then formulated as finding the shortest path (shortest in the sense of energy/cost minimization) that starts at the initial anchor node, encircles the core region, and then ends at the initial anchor node.

Such shortest path problem can be solved by minimizing a cost formula providing an edge cost for each of the plurality of edges of the two-dimensional graph. In particular, the cost formula can provide an edge cost for each edge that is inversely proportional to the amount of evidence traversed by such edge. For example, edge costs can be generally inversely proportional to the sum of all evidence values of the pixels associated with all nodes traversed by such edge. Thus, solutions can be biased toward edges that traverse nodes associated with pixels having high evidence values.

Further, in some implementations, each edge cost can include a fixed constant. Due to such fixed constant, the solution is biased towards fewer edges overall and therefore results in a simpler floorplan. Also, a single edge of greater distance can be preferred over multiple edges, all other parameters equal. Such simplicity is desirable as it reduces the complexity of the image texture mapping and stitching process.

Once the shortest path around the core region is determined, the resulting floorplan is extruded to the previously determined floor and ceiling heights to form the three-dimensional mesh model. For each edge of the floorplan (i.e. wall of the mesh model) a single panorama can be used to map texture. With this approach, stitching artifacts are not visible on the wall, but are instead concentrated on wall boundaries where textures are generally less significant. As floor and ceiling textures generally cannot be constructed using a single panorama, a standard texture stitching algorithm can be used for floor and ceiling textures.

Another aspect of the present disclosure resolves the tendency of the above-outlined shortest path problem to miss "thin walls" such as room dividers or open archways. For example, after solving for the shortest path, a large number of pixels interior to the floorplan with non-zero evidence values can remain unexplained by the initial floorplan solution. To resolve this problem, the solution can be refined by forcing the path to pass through one or more additional anchor nodes.

In particular, for each node traversed by the initial solution path, the number of proximate pixels, interior to the solution path but not in the core region with a positive evidence value is determined. In other words, the number of unexplained pixels with a non-zero evidence value that are closest (without crossing the core region) to each node traversed by the initial solution path is determined. If the number of such unexplained pixels is greater than a threshold number, then the farthest of such pixels is added as a supplemental anchor node and the solution can be recomputed. In such fashion, the solution can be forced to account for thin walls.

Further, while the above method for adding supplemental anchor nodes has been disclosed as performing analysis with respect to each node traversed by the initial solution path, it will be appreciated that such method can be performed at other levels of discretization. In particular, such method can be performed at points along the initial solution path according to any suitable interval, including intervals which are smaller or larger than the interval between nodes of the graph.

Another aspect of the present disclosure combats the shrinkage bias that results from having an incomplete core region by constraining the solution such that all data capture locations (e.g. optical centers of panoramic images) must be inside the floorplan solution. In particular, a minimum spanning-tree can be generated that connects together a plurality of pixels respectively associated with a plurality of data capture locations. The spanning-tree can be added to the core region and, thus, the shortest path must include all data capture locations inside.

Yet another aspect of the present disclosure increases computational efficiency by limiting the set of edges available for selection to those that correspond to two or more dominant directions. In particular, two or more dominant directions can be determined by fitting three-dimensional planes to the three-dimensional point cloud, fitting two-dimensional lines onto the two-dimensional solution space, or performing line segment extraction from one or more of the input panoramic images. The set of edges that are available for selection by the shortest path solver can be limited to those edges that are generally aligned with such dominant directions.

Exemplary Three-Dimensional Model

FIG. 1 depicts exemplary panoramic images 102, 104, and 106 and an exemplary three-dimensional model 108 according to an exemplary embodiment of the present disclosure. Panoramic images 102, 104, and 106 can depict the interior of building or structure from a plurality of different camera locations. For example, as shown in FIG. 1, panoramic images 102, 104, and 106 can be of the interior of a restaurant, café, or other suitable building or structure. Generally, panoramic images of the interior of any building, structure, vehicle, stall, framework, or other suitable entity can be used to implement the present disclosure.

Panoramic images 102, 104, and 106 can be created using a single panoramic camera or can be constructed from multiple images. Generally, if one or more of panoramic images 102, 104, and 106 is created from multiple images it is preferred that such images share a common optical center, such as a shared camera location.

According to aspects of the present disclosure, panoramic images 102, 104, and 106 can be used to generate three-dimensional model 108. Generally, three-dimensional model 108 is a photorealistic model of the interior of the building or structure captured in panoramic images 102, 104, and 106.

Three-dimensional model 108 can be any suitable form of model. For example, three-dimensional model 108 can be a portion of a photorealistic map. As another example, three-dimensional model 108 can be viewed using a three-dimensional visualization system that allows a user to navigate and inspect three-dimensional model 108 from alternate viewpoints, zoom-levels, or perspectives. For example, three-dimensional model 108 can be incorporated into a geographic information system such that a user of the geographic information system can search for or otherwise discover the structure depicted in three-dimensional model 108 and then further investigate, browse, or view the interior of such structure in a photorealistic three-dimensional fashion.

Incorporation of three-dimensional model 108 into a geographic information system can have many benefits, including educational, informational, and recreational benefits. For example, three-dimensional model 108 can provide a photorealistic tour of the interior of a museum or other landmark, increasing the availability of such museum or landmark to the general public.

According to aspects of the present disclosure, three-dimensional model 108 can be created by estimating one or more vertical dimensions of the structure depicted in such model based data from panoramic images 102, 104, and 106, determining a floorplan of the structure from such data, extruding the determined floorplan to the vertical dimensions, and then texture mapping one or more of panoramic images 102, 104 or 106 onto the three-dimensional mesh.

Exemplary Three-Dimensional Point Cloud

Figure 2:
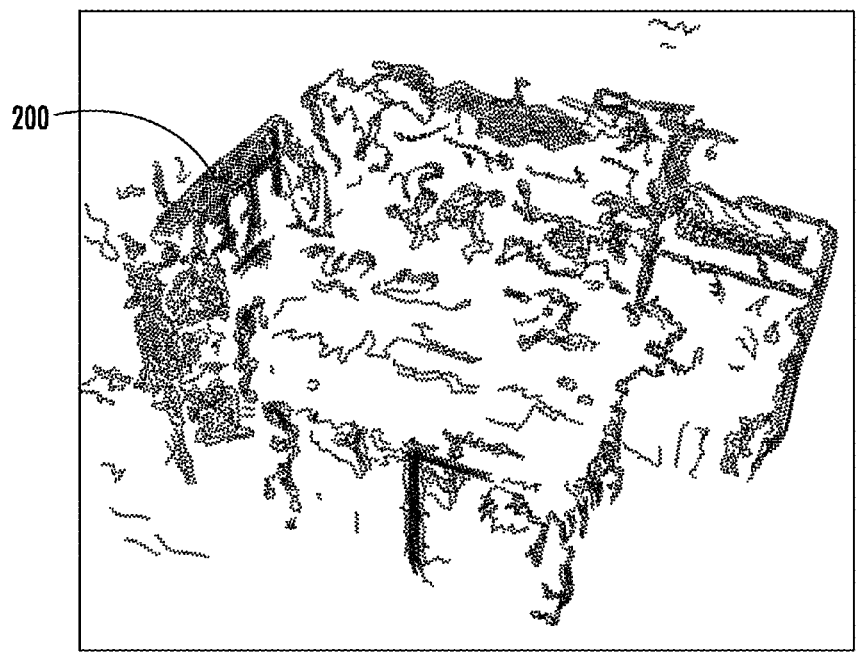
FIG. 2 depicts an exemplary three-dimensional point cloud according to an exemplary embodiment of the present disclosure.

FIG. 2 depicts an exemplary three-dimensional point cloud 200 according to an exemplary embodiment of the present disclosure. Three-dimensional point cloud 200 can include a plurality of points, with each point having a defined three-dimensional location. Generally, each point in three-dimensional point cloud 200 represents some level of evidence that a physical item exists at the three-dimensional space corresponding to such point.

Three-dimensional point cloud 200 can be generated using any appropriate technique or combination of techniques, including, without limitation, laser scanning, structure from motion, multi-view stereo algorithms, or other suitable forms of computer vision or computer operation. As an example, a depth camera can employ a structured light technique to generate three-dimensional point cloud 200.

Preferably, three-dimensional point cloud 200 is defined in three-dimensional Cartesian space. However, other coordinate systems can be used, including cylindrical or spherical coordinate systems.

According to an aspect of the present disclosure, three-dimensional point cloud 200 can be generated from panoramic photographs, such as, for example, panoramic photographs 102, 104, and 106 of FIG. 1. In particular, a multi-view stereo ("MVS") algorithm can be used to reconstruct the interior of a structure from the panoramic images. MVS techniques often employ knowledge of pose and matching in order to reconstruct geometric object and scene models from multiple photographs, a process which can be referred to as image-based modeling or 3D photography. Such reconstruction can include three-dimensional point cloud 200.

As an example, PMVS ("Patch-based Multi-view Stereo") is a state-of-the-art MVS system created by Yasutaka Furukawa, a named inventor of the present subject matter. "Accurate, Dense, and Robust Multi-View Stereopsis." Y. Furukawa and J. Ponce. *IEEE Transactions on Pattern Analysis and Machine Intelligence*, 32(8):1362-1376, 2010 describes the operation of PMVS and is expressly incorporated herein by reference for all purposes.

In particular, PMVS outputs a dense set of small rectangular patches covering the surfaces visible in the images. Each rectangular patch further includes a normal which provides an estimated orientation of such patch. Thus, when three-dimensional point cloud 200 is created using PMVS, each point in the point cloud can be one of such rectangular patches. Each patch has been identified in at least two images. Further, the PMVS technique provides a confidence value for each patch that corresponds to the number of unique images in which the patch was located. Other techniques can also be used to create three-dimensional point cloud 200. While it is preferable that such other techniques provide similar indicators of a degree of confidence or level of evidence associated with each point in a resulting point cloud, confidence values assigned to each point in three-dimensional point cloud 200 are not a mandatory aspect of the present disclosure.

One or more vertical dimensions of the structure can also be estimated based on the panoramic images. For example, a floor height and a ceiling height of the interior of the building or structure can be estimated. The floor height and ceiling height can be expressed relative to one or more optical centers of one or more panoramic images or can be independently defined within the three-dimensional space.

As an example, a plane sweeping algorithm can be performed in order to estimate the height of the floor and ceiling. In particular, a horizontal plane can be swept through three-dimensional space. At each height, the panoramic images can be projected onto such horizontal plane and the consistency of the overlapping projected textures can be computed. The floor and ceiling heights can be identified as the heights at which amount of texture consistency is at relative maximums. For example, floor height can be the height below the camera center at which consistency is maximized while ceiling height is the height above such camera center at which consistency is maximized.

In other implementations, three-dimensional point cloud 200 can be analyzed in order to estimate the one or more vertical dimensions. As an example, floor and ceiling height estimation can be performed by sweeping a horizontal plane through three-dimensional point cloud 200 and counting, for each horizontal volume slice, the number of associated points located in such slice. The average of the non-zero counts can be computed. The floor plane can be determined to be the bottom-most slice with a count greater than the computed average and the ceiling plane can be the top-most slice with a count greater than the computed average.

As another example, in the instance in which three-dimensional point cloud 200 includes orientation data for each point (e.g. normals), three-dimensional point cloud 200 can be filtered based on normal direction. More particularly, floor height determination can be performed with respect to only those points or patches that have a normal pointing generally upwards while ceiling height determination can be performed with respect to only those points or patches that have a normal pointing generally downwards.

Although several specific exemplary methods of estimating vertical dimensions are provided, the present disclosure can be satisfied through the use of any suitable method for estimating such vertical dimensions. Further, the confidence values respectively associated with the plurality of points of three-dimensional point cloud 200 can also be used, if available, to weight any determinations or to implement pre-filtering for any suitable method. In addition, while the examples provided above generally discuss a single floor height and a single ceiling height, the present disclosure is not limited to only one floor or one ceiling height but can accommodate a plurality of different estimates with respect to vertical dimensions. As an example, the plane sweeping algorithms disclosed above can be discretized into a plurality of regions or areas and vertical dimensions can be estimated for each area.

According to further aspects of the present disclosure, after the one or more vertical dimensions have been estimated, a two-dimensional graph can be generated based on three-dimensional point cloud 200. Such two-dimensional graph can be used in order to reconstruct a two-dimensional floorplan of the interior of the building or structure.

Exemplary Two-Dimensional Solution Space

Figure 3:
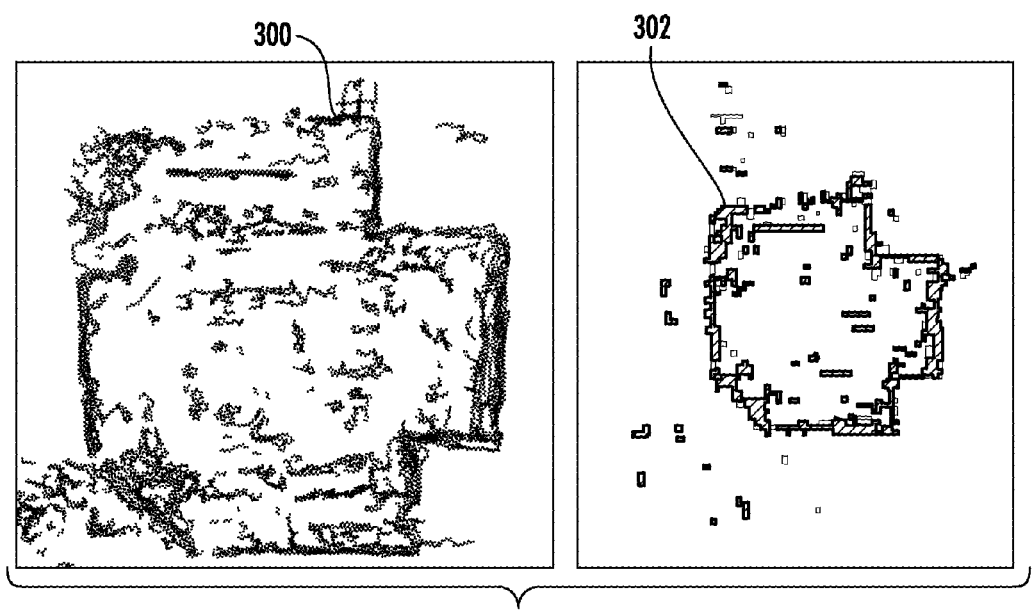
FIG. 3 depicts a top-down view of an exemplary three-dimensional point cloud and an exemplary two-dimensional solution space according to an exemplary embodiment of the present disclosure.

FIG. 3 depicts a "top-down" view 300 of an exemplary three-dimensional point cloud and an exemplary two-dimensional solution space 302 according to an exemplary embodiment of the present disclosure. In particular, the vertical component (e.g. a z-axis component) of each point included in three-dimensional point cloud 200 of FIG. 2 can be discarded or otherwise ignored to render top-down view 300. Top-down view 300 can be used as a two-dimensional solution space.

Alternatively, further processing, filtering, or other enhancements can be applied to top-down view 300 or three-dimensional point cloud 200 in order to create a two-dimensional solution space, such as two-dimensional solution space 302. As an example, in the instance in which three-dimensional point cloud 200 includes orientation data for each point (e.g. normals), points with normals pointing generally vertical can be filtered out so that only points with normals pointing in a general horizontal direction remain. The remaining points can then be projected onto a horizontal plane in order to generate two-dimensional solution space 302.

Two-dimensional solution space 302 can include a plurality of pixels. Each pixel can have a designated position such as, for example, an x-axis value and a y-axis value. Each point in three-dimensional point cloud 200 can be associated with a pixel in two-dimensional solution space 302. However, each pixel in two-dimensional solution space 302 does not necessarily have any points associated with it.

The resolution of the pixels of two-dimensional solution space 302 can be identical to the level of discretization provided in the x-axis and y-axis directions of three-dimensional point cloud 200. In other words, in one implementation, each position occupied by a point of three-dimensional point cloud 200 can map to a pixel of two-dimensional solution space 302. However, other suitable resolutions can be used.

Furthermore, each pixel of two-dimensional solution space 302 can have an evidence value describing an amount of evidence that a physical item exists in a three-dimensional location associated with such pixel. As an example, the evidence value for each pixel can equal the number of points associated with such pixel. For example, with reference to three-dimensional point cloud 200 of FIG. 2, it can be seen that multiple points may share an x-axis value and a y-axis value while having differing z-axis values. As such, the evidence value for each pixel of two-dimensional solution space 302 can equal the number of points in three-dimensional point cloud 200 that share the same x-axis and y-axis values with such pixel. Put another way, the evidence value for each pixel of two-dimensional solution space 302 can equal the number of point of three-dimensional cloud 200 that would be projected onto such pixel if three-dimensional point cloud 200 were projected on a two-dimensional x-y plane.

As another example, the evidence value for each pixel can also reflect or include the confidence value information associated with the points corresponding to such pixel. For example, the evidence value for each pixel of two-dimensional solution space 302 can equal the sum of the confidence values associated with all points in three-dimensional point cloud 200 that share the same x-axis and y-axis values as such pixel or would be projected onto such pixel.

While the term "pixel" is used herein, one of skill in the art will appreciate that two-dimensional solution space 302 does not necessarily need to displayed or visualized in order to satisfy the present disclosure. In particular, aspects of the present disclosure can be performed by an exemplary computing system according to one or more predefined algorithms. In particular, two-dimensional solution space 302 can be stored, represented, or embodied as computer-readable data and one or more operations can be performed with respect to two-dimensional solution space 302 by reading, creating, and/or modifying such computer-readable data. As such, the use of the term "pixel" herein should not be interpreted as necessarily referring to a unit of display or visualization. Instead, the term "pixel" as used herein refers to a discrete, identifiable unit of two-dimensional solution space 302, whether such solution space is displayed for human visualization or stored in computer-readable format. Thus, the term "pixel" as used herein is conceptual in nature and can be embodied in the form of computer-readable data.

However, when two-dimensional solution space 302 is displayed for human visualization, pixels with non-zero evidence values can be identified and provided with a contrasting color, pattern, or other designation. For example, as shown in FIG. 3, the pixels of two-dimensional solution space 302 that have non-zero evidence values can be identified with respect to all other pixels. Further, a scale of identifiers can be used such that the relative magnitude of each pixel's evidence value can be determined. For example, a scale of color or scale of shading can be used to indicate the evidence values for each pixel.

As another example of suitable pre-processing, one or more dominant directions can be determined by fitting three-dimensional planes to three-dimensional point cloud 200, fitting two-dimensional lines onto two-dimensional solution space 302, or performing line segment extraction from one or more of the input panoramic images. Next, the two-dimensional solution space can be rotated so that the determined dominant directions correspond with traditional notions of x and y axes. For example, as shown in FIG. 3, two-dimensional solution space 302 has been depicted or rotated so that the two dominant directions evidenced by the evidence values of its pixels correspond with an x-axis and a y-axis.

Exemplary Free-Space Evidence Map and Core Region

Figure 4:
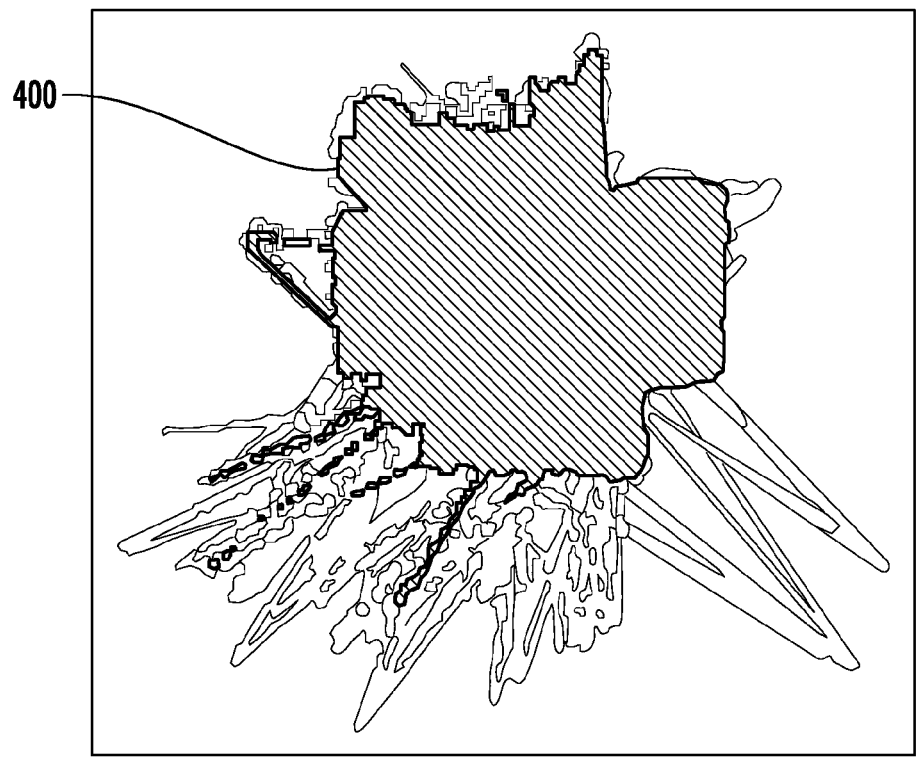
FIG. 4 depicts an exemplary free-space evidence map according to an exemplary embodiment of the present disclosure.

FIG. 4 depicts an exemplary free-space evidence map 400 according to an exemplary embodiment of the present disclosure. Free-space evidence map 400 can be constructed based on or with respect to two-dimensional solution space 302 of FIG. 3. In particular, free-space evidence map 400 can describe or depict a free-space value for each pixel of two-dimensional solution space 302. The free-space value for each pixel can be proportional to an amount of accumulated evidence that such pixel corresponds to the interior of the building.

As an example, as discussed above, each point in three-dimensional point cloud 200 can be located in two or more of the panoramic images. Further, the optical center of each of such panoramic images can be known, either as a given input or by performing a structure from motion algorithm. As such, the space between each three-dimensional point and the optical center of each panoramic image in which such point was located should be in "free space," or inside the building. Such free-space evidence can be accumulated across all points in three-dimensional point cloud 200 in order to determine the free-space values for each pixel of two-dimensional solution space 302.

In particular, each point in three-dimensional point cloud 200 can be associated with one pixel in two-dimensional solution space 302. Further, each point can have been located in two or more panoramic images captured from respective optical centers. Each of such optical centers can be associated with a respective pixel in two-dimensional solution space 302. Thus, a ray can be casted from each pixel associated with one of such optical centers to the pixel associated with such point. Therefore, each point can result in at least two rays being casted from two pixels respectively associated with two optical centers to the pixel associated with such point in two-dimensional solution space 302.

Casting such rays with respect to each of the points in three-dimensional point cloud 200 can result in a large number of rays being casted with respect to two-dimensional solution space 302. The free-space value of each pixel of two-dimensional solution space 302 can be incremented with respect to each instance in which such pixel is traversed by one of the plurality of rays.

Therefore, pixels which lie between a pixel associated with an optical center and a pixel associated with a point that was located in a photograph captured from such optical center will be incremented. After casting a substantial number of rays, the free-space values for all pixels of two-dimensional solution space 302 can provide a strong indication of an estimated interior of the building, as depicted in free-space map 400 of FIG. 4.

The above discussed method of generating free-space values is not limited to data points resulting from performance of a MVS algorithm with respect to panoramic images, but instead can be performed with respect to data captured according to any suitable device or method so long as the location of data capture is generally known or estimated. For example, laser data captured by a laser scanner positioned at a known location can be used in accordance with the above method.

As another example, a depth camera can be continuously moved about the indoor space while capturing data. A pose and position of the depth camera can be estimated based on six degrees-of-freedom information and other data. The free-space value for a pixel can be incremented for each instance in which such pixel lies between a pixel associated with captured evidence data and a pixel associated with the location of capture of such data.

Further, while a particular method of generating free-space values for use in free-space evidence map 400 has been provided above, the present disclosure is not limited to such method. In particular, other suitable methods can be used to determine free-space values for each pixel of two-dimensional solution space 302.

Figure 5:
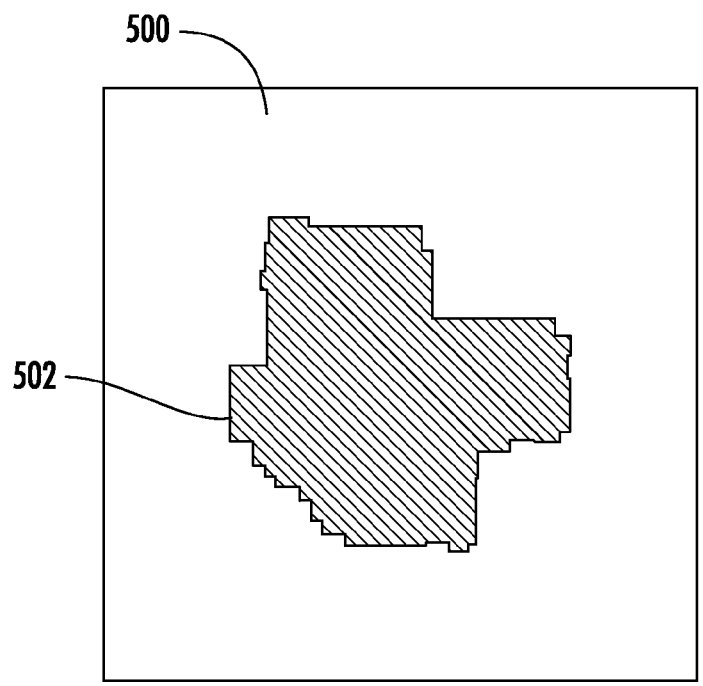
FIG. 5 depicts an exemplary core region according to an exemplary embodiment of the present disclosure.

FIG. 5 depicts an exemplary core region 502 of an exemplary two-dimensional solution space 500 according to an exemplary embodiment of the present disclosure. In particular, core region 502 can be identified by applying a threshold to free-space evidence map 400 of FIG. 4.

For example, each pixel of free-space evidence map 400 can have a free-space value that is proportional to an amount of accumulated evidence that such pixel corresponds to the interior of the building. Core region 502 can be identified by selecting only those pixels that have a free-space value that exceeds a threshold value. Further, core region 502 can be non-contiguous or can be constrained to be contiguous, as desired.

In such fashion, only those pixels that likely correspond to the interior of the building (i.e. have a large free-space value) are included in core region 502. Intuitively, the floorplan of the building is a path that surrounds core region 502.

Exemplary Solution to Shortest Path Problem

Figure 6:
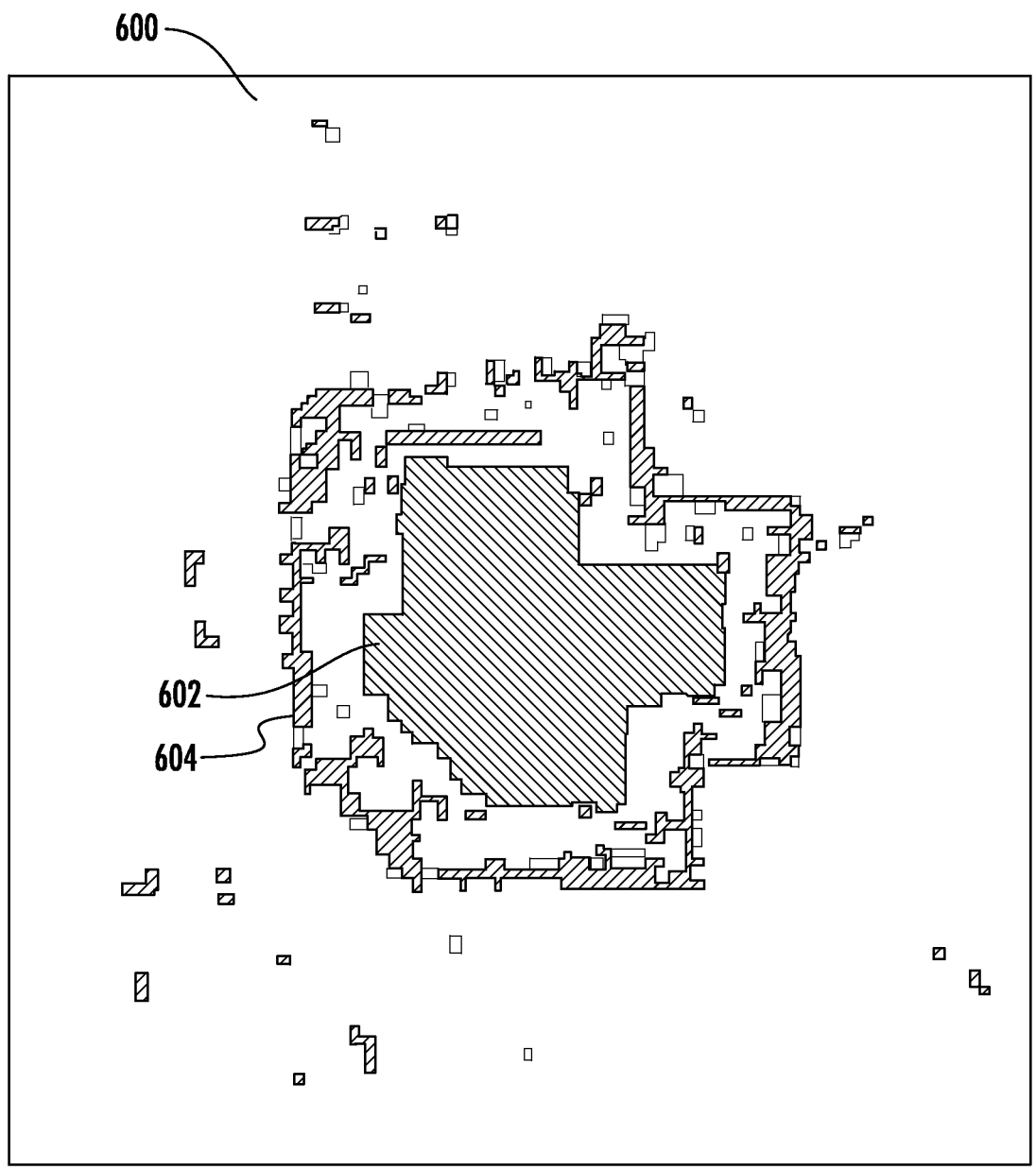
FIG. 6 depicts an exemplary two-dimensional solution space according to an exemplary embodiment of the present disclosure.

FIG. 6 depicts an exemplary two-dimensional solution space 600 according to an exemplary embodiment of the present disclosure. In particular, two-dimensional solution space 600 includes core region 602. Further, as shown in FIG. 6, pixels not included in core region 602, such as, for example, pixel 604, can be marked to indicate non-zero evidence values.

According to aspects of the present disclosure, a two-dimensional graph can be generated based on two-dimensional solution space 600. In particular, each pixel of two-dimensional solution space 600 can be treated as a node of the two-dimensional graph. As will be discussed further with respect to FIG. 7, a plurality of edges can respectively connect the plurality of nodes. Then, reconstruction of a floorplan for the structure evidenced in two-dimensional solution space 600 can be posed as a shortest path problem and solved using the two-dimensional graph.

Figure 7:
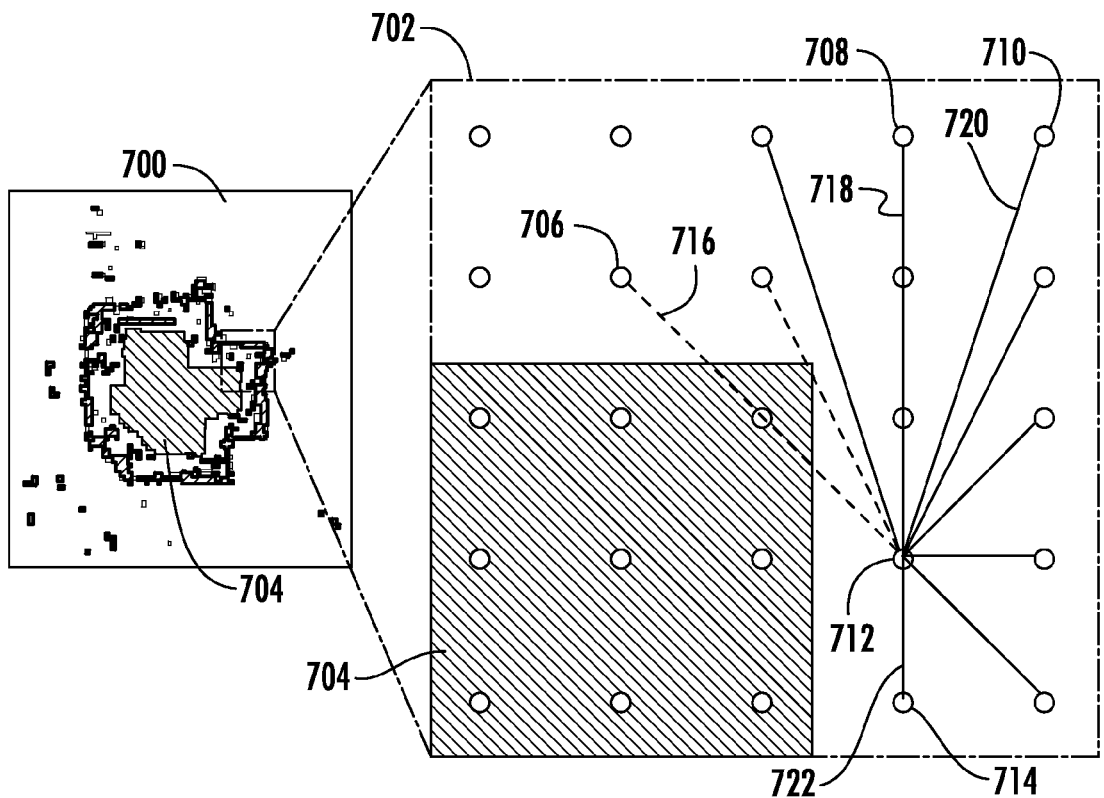
FIG. 7 depicts an exemplary two-dimensional graph according to an exemplary embodiment of the present disclosure.

FIG. 7 depicts an exemplary two-dimensional graph 700 according to an exemplary embodiment of the present disclosure. In particular, FIG. 7 depicts a magnified portion 702 of two-dimensional graph 700 and a core region 704.

According to aspects of the present disclosure, each pixel of two-dimensional solution space 600 can be treated as a node of two-dimensional graph 700. However, such one-to-one correlation is not required and other suitable configurations can be used to generate the nodes of two-dimensional graph 700.

A node can be connected to another node by an edge. Importantly, every pair of nodes can be connected by an edge so long as such connecting edge does not cross core region 704. As such, the set of edges available for selection includes edges of significant length, also known as "long jumps."

Magnified potion 702 provides an exemplary depiction of the individual nodes of two-dimensional graph 700, including exemplary nodes 706, 708, 710, 712, and 714. Further, a plurality of edges are depicted, including exemplary edges 716, 718, 720, and 722.

More particularly, magnified portion 702 shows edges connecting node 712 to its surrounding nodes, including nodes 708, 710, and 714. Edges 718, 720, and 722 can be included in two-dimensional graph 700 because such edges connect two nodes without crossing the core region.

However, edge 716 is not included in two-dimensional graph 700 because edge 716 traverses core region 704. Therefore, edge 716 is depicted using a dashed line. To be clear, edge 716 is depicted only for the sake of demonstrating that it crosses core region 704 and therefore would not be included in exemplary two-dimensional graph 700.

Further, it will be appreciated that the edges depicted in magnified portion 702 are selected for the purposes of providing examples. In particular, magnified portion 702 depicts only the edges associated with node 712. Therefore, many edges in addition to those depicted in FIG. 7 exist within two-dimensional graph 700.

As an example, magnified portion 702 shows edge 718 extending between node 712 and node 708 and shows edge 722 extending between node 712 and node 714. However, an additional edge exists that extends between node 708 and node 714, therefore combining edge 718 and edge 722.

Thus, the set of edges available for consideration in solving the shortest path problem are not limited to edges that connect adjacent nodes, but instead can include all edges connecting any two nodes of two-dimensional graph 700 so long as such edge does not cross core region 704. Thus, "long jump" edges that extend a significant distance and traverse a plurality of nodes can be included in two-dimensional graph 700.

According to an aspect of the present disclosure, a cost formula can provide an edge cost for each edge. Such edge cost can be inversely proportional to the amount of evidence traversed by the associated edge. As an example, each edge cost for each edge can inversely proportional to the sum of the evidence values of the pixels associated with all nodes traversed by the edge.

As another example, in the instance in which orientation data is provided for each point in three-dimensional point cloud 200 of FIG. 2 (e.g. normals), the edge cost for each edge of two-dimensional graph 700 can be inversely proportional to the total number of points or patches associated with the pixels associated with all nodes traversed by such edge that have normals generally perpendicular to such edge and pointing towards the core region (as opposed to pointing towards the exterior of the building).

According to another aspect of the present disclosure, the edge cost for each edge of two-dimensional graph 700 can include a fixed positive constant. Through the use of such fixed constant, path costs are regularized so that paths that include larger number of edges are penalized. Therefore, the shortest path problem can be biased towards solutions that include a fewer number of edges.

For example, with respect to magnified portion 702, the edge cost of the edge extending between node 714 and node 708 can always be less than the combined cost of edges 718 and 722 when a fixed constant is added to each edge cost. In particular, the edge extending between node 714 and node 708 will have one edge penalty (constant) rather than two. Using a fixed constant in each edge cost to bias towards solutions with fewer edges provides for more simplified floorplans, thus satisfying the goal that the rendering/texturing artifacts associated with overly complex floorplans be minimized.

One of skill in the art will appreciate, in light of the disclosures provided herein, that the magnitude of the fixed constant can be varied according to design goals. In particular, a larger fixed constant can result in solution paths with fewer edges. However, such paths may underfit the given data. Likewise, a smaller fixed constant can result in solution paths with more edges. However, such paths may overfit the given data.

According to yet another aspect of the present disclosure, one or more dominant directions of two-dimensional graph 700 can be determined, a concept known as "vanishing points" or "Manhattan world assumptions." As an example, in the instance in which orientation data is available for the points of the three-dimensional point cloud, a histogram of such orientation data can be analyzed to identify the most common point or patch orientations. The dominant directions can then be the directions which are perpendicular to the most common orientations. As another example, a Hough transform can be used to identify the dominant directions. As yet more examples, two or more dominant directions can be determined by fitting three-dimensional planes to the three-dimensional point cloud, fitting two-dimensional lines onto the two-dimensional solution space, or performing line segment extraction from one or more of the input panoramic images.

The determined dominant directions can optionally be used to influence the costs or existence of edges. As an example, the edge cost for each edge can have a term that increases or decreases the cost of such edge with respect to whether the direction of such edge is respectively inconsistent or consistent with one of the determined dominant directions. In other words, an edge that is inconsistent with the determined directions may have a higher cost, all other parameters being equal, than an edge that is consistent with one of the determined dominant directions.

As another example, the edges available for selection by the shortest path solver can be limited to those edges that are consistent with the determined dominant directions. In other words, two-dimensional graph 700 can be pruned of edges that do not correspond to the determined dominant directions, leaving only those edges that do correspond to the dominant directions available for selection. One benefit of such approach is that computational efficiency can be increased as the set of edges available for consideration is greatly reduced.

However, such methods with respect to dominant directions are optional in nature. In particular, because the solution path is biased towards fewer edges that traverse large amounts of evidence, edges which correspond with dominant trends in the data are typically selected without need for additional pruning or weighting.

Figure 8:
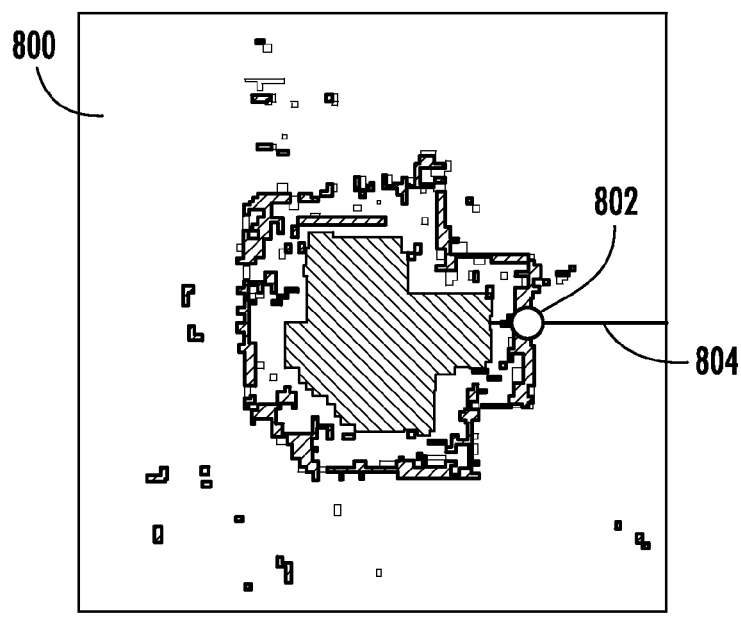
FIG. 8 depicts an exemplary anchor node and an exemplary constraint line imposed on an exemplary two-dimensional solution space according to an exemplary embodiment of the present disclosure.

FIG. 8 depicts an exemplary anchor node 802 and an exemplary constraint line 804 imposed on an exemplary two-dimensional solution space 800 according to an exemplary embodiment of the present disclosure. In particular, initial anchor node 802 can be selected from the plurality of nodes included in of two-dimensional graph 700. Initial anchor node 802 can serve as the starting and ending place for a solution path that circumnavigates the core region. Therefore, initial anchor node 802 should be a node that corresponds to a wall of the building. As such, initial anchor node 802 should be associated with a pixel that has a relatively large evidence value.

For example, initial anchor node 802 can be the node of two-dimensional graph 700 that is associated with the pixel of two-dimensional solution space 800 that has the evidence value of greatest magnitude. As another example, initial anchor node 802 can be selected from a plurality of candidate nodes based on a number of factors, including whether each candidate node is associated with a pixel that has an evidence value that is larger than an average evidence value associated with all other pixels. Other exemplary factors can include the position of each candidate node with respect to the core region or the evidence values of the pixels associated with surrounding nodes.

Next, a solution path can be determined that starts from initial anchor node 802, circumnavigates the core region, and returns to initial anchor node 802. For example, the solution path can be the solution to a shortest path problem, where path costs are cheaper when a path traverses nodes associated with pixels having non-zero evidence values. The solution path can made of selected of the plurality of edges included in two-dimensional graph 700.

However, because initial anchor node 802 is both the start and the finish, a trivial solution exists, such as a path with zero length. In order to constrain the solution path such that is circumnavigates the core region, constraint line 804 can be added to two-dimensional graph 700. In particular, constraint line 804 can extend from a center of the core region through initial anchor node 802 to the boundary of two-dimensional graph 700. The solution path is then constrained such that it cannot cross constraint line 804.

After the addition of initial anchor node 802 and constraint line 804, the shortest path problem can be solved in the two-dimensional graph by selecting from among the plurality of edges using a shortest path solver. In particular, the solution path can minimize a cost formula providing an edge cost for each of the plurality of edges.

Further, while the selection of initial anchor node 802 has been discussed above as being performed with respect to a two-dimensional graph, it will be appreciated that an initial anchor pixel can be selected from a two-dimensional solution space prior to the creation of the two-dimensional graph. In such instance, initial anchor node 802 can simply be the node that corresponds to the previously selected initial anchor pixel.

Figure 9:
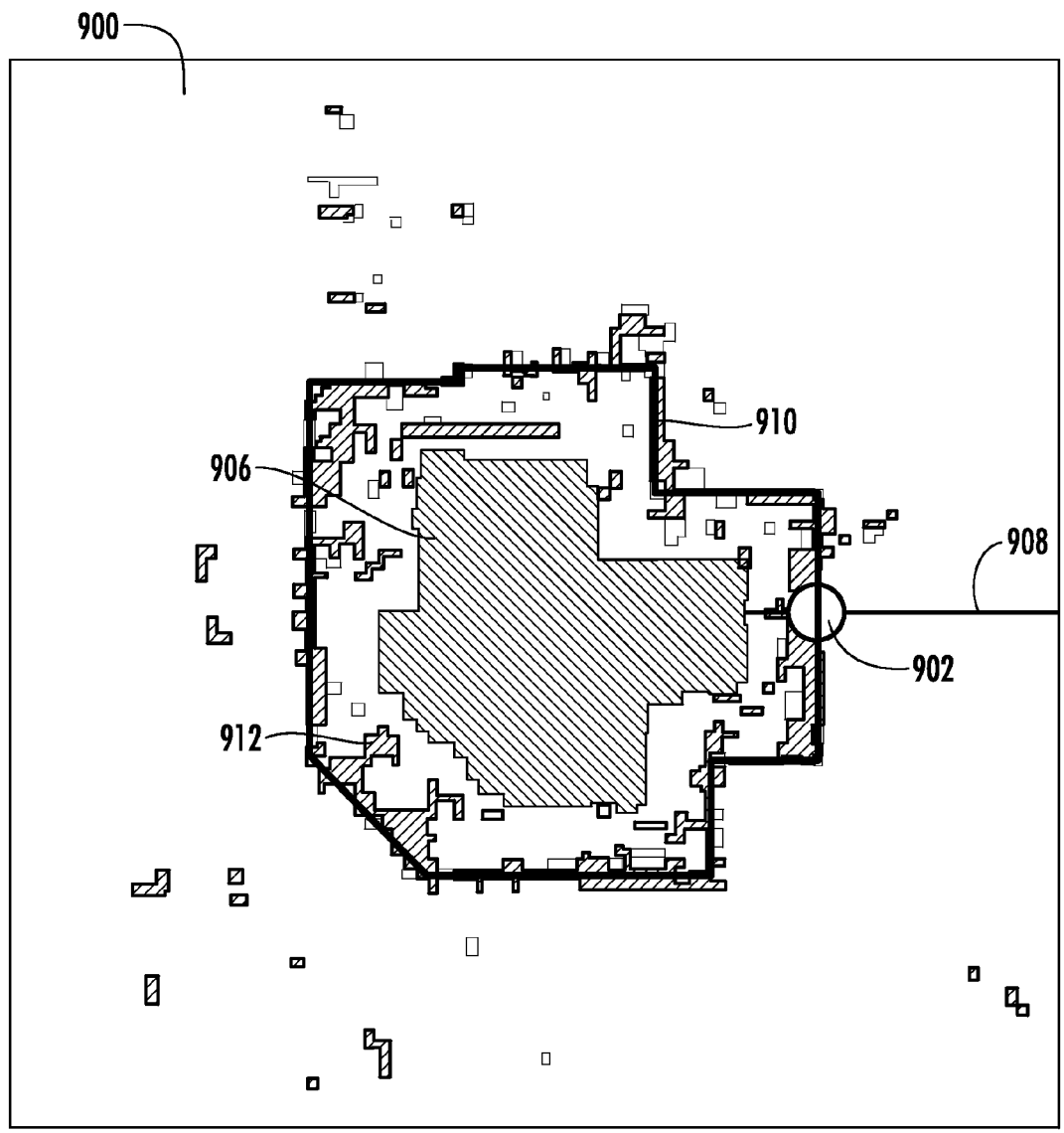
FIG. 9 depicts an exemplary solution path according to an exemplary embodiment of the present disclosure.

FIG. 9 depicts an exemplary solution path 910 according to an exemplary embodiment of the present disclosure. Solution path 910 is depicted as imposed on a Two-dimensional solution space 900. Also depicted is an initial anchor node 902, a core region 906, and a constraint line 908.

In particular, as depicted in FIG. 9, solution path 910 starts at initial anchor node 902, circumnavigates core region 906, and returns to initial anchor node 902 without traversing constraint line 908. Solution path 910 can be the solution to the shortest path problem constructed according to the graph construction methods discussed with respect to FIGS. 7 and 8. Solution path 910 can be determined by using any suitable shortest path algorithm to minimize the cost formula and satisfy the given constraints.

While the term "minimize" a cost formula is used herein, one of skill in the art, in light of the disclosures contained herein, will understand that in certain circumstances it can be desirable to determine a solution path that simply reduces the cost formula to below an acceptable threshold value such that an absolute mathematical minimum is not reached. For example, if aspects of the present disclosure are implemented using an iterative algorithm, computational efficiency can be increased by determining a solution path that has a cost below an acceptable threshold value. Reduction of the cost formula to below an acceptably small threshold value can be used to satisfy the present disclosure in substantially the same way as minimizing the cost formula.

Thus, solution path 910 of FIG. 9 represents a collection of edges that minimizes a cost formula in accordance with the present disclosure. Solution path 910 can be used as the floorplan to construct the three-dimensional model of the building.

Figure 10:
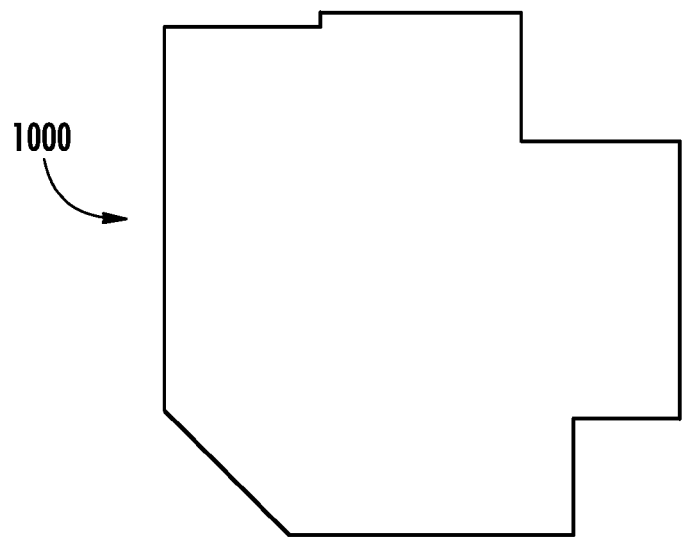
FIG. 10 depicts an exemplary floorplan according to an exemplary embodiment of the present disclosure.

In particular, solution path 910 can be isolated or extracted in order to obtain floorplan 1000 of FIG. 10. As such, FIG. 10 depicts an exemplary floorplan 1000 according to an exemplary embodiment of the present disclosure.

Floorplan 1000 can be extruded (i.e. extended vertically) to the vertical dimensions previously estimated. For example, a three-dimensional mesh model can be made in the shape of floorplan 1000 extended to the previously estimated floor height and ceiling height.

A plurality of panoramic images, such as, for example, panoramic images 102, 104, and 106 of FIG. 1, can be texture mapped onto the three-dimensional mesh model in order to create a photorealistic three-dimensional model.

Figure 11:
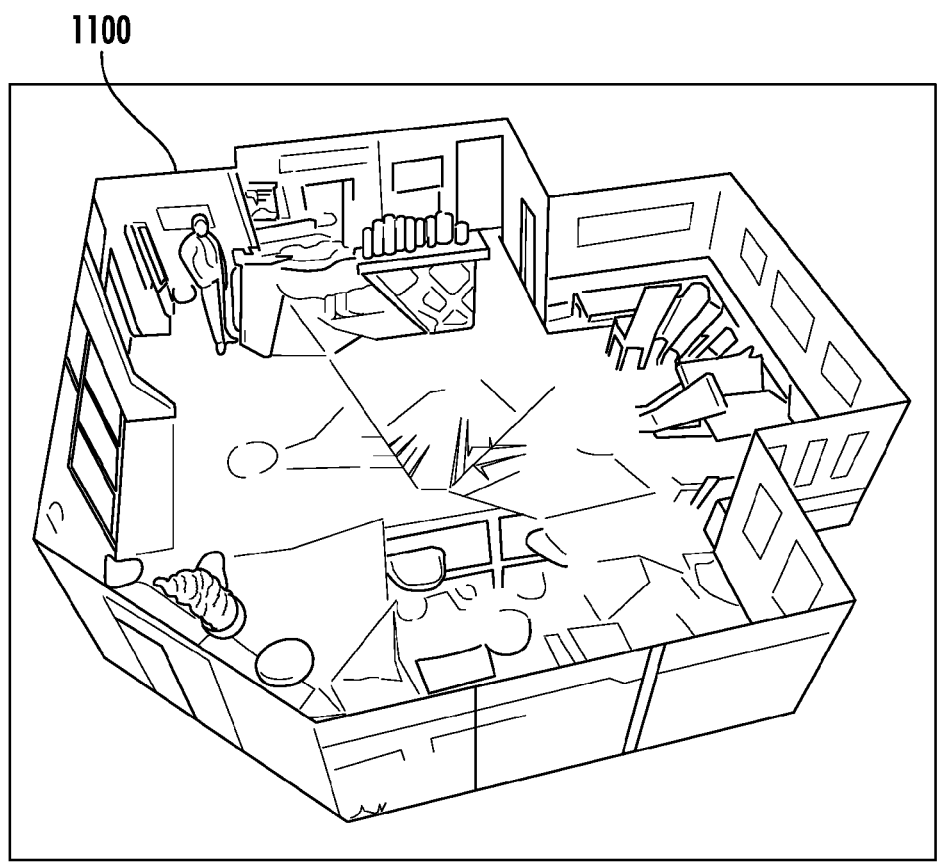
FIG. 11 depicts an exemplary three-dimensional model according to an exemplary embodiment of the present disclosure.

In particular, FIG. 11 depicts an exemplary three-dimensional model 1100 according to an exemplary embodiment of the present disclosure. Each wall of three-dimensional model 1100 can correspond to an edge of floorplan 1000 of FIG. 10. Further, a single panoramic image can be used to map texture for each wall of three-dimensional model 1100. In such fashion, stitching and texturing artifacts are concentrated at wall boundaries where textures are usually less visually important.

Three-dimensional model 1100 can be provided to a user to explore, navigate, visualize, or otherwise interact with. Further, in some implementations, the texture mapping of images to three-dimensional model 1100 can be view-dependent such that texture mapping occurs in real-time as the use navigates throughout three-dimensional model 1100. Generally, floor texture cannot be mapped from a single panorama and therefore a standard texture stitching algorithm can be used to provide floor texture.

Exemplary Thin Wall Carving

Because the shortest path problem as constructed above biases towards using fewer edges and seeks to minimize total cost, solution paths almost never have sufficient incentive to deviate from a given route or edge just to visit a given node and then return to the previously visited position. As such, thin walls such as room dividers or open archways between portions of a room will often be missed or unexplained by a solution path and therefore unrepresented in the resulting floorplan and model.

Thus, following the initial determination of a solution path, a plurality of unexplained pixels can remain. In particular, unexplained pixels are those pixels that are interior to the solution path, are not within the core region, and have a non-zero evidence value.

As an example, referring to FIG. 9, initial solution path 910 leaves a plurality of unexplained pixels. For example, pixel 912 is interior to solution path 910, not in core region 906, and has a non-zero evidence value. Therefore pixel 912 is unexplained.

The solution path can traverse a plurality of nodes and such nodes can be referred to as solution-nodes. According to an aspect of the present disclosure, the number of proximal unexplained pixels can be determined for each solution-node. An unexplained pixel is proximal to a given solution-node if such solution-node is the most proximate of all solution-nodes, without traversing the core region.

According to another aspect of the present disclosure, when the number of proximal unexplained pixels for a given solution-node is greater than a threshold number, then the least proximate of such proximal unexplained pixels can be designated as a supplemental anchor node. Then, a subsequent or revised solution path can be determined that minimizes the cost formula while visiting each of the supplemental anchor nodes in addition to the initial anchor node, thus capturing or explaining thin walls.

Further, while the above method for adding supplemental anchor nodes has been disclosed as performing analysis with respect to each node traversed by the initial solution path, it will be appreciated that such method can be performed at other levels of discretization. In particular, such method can be performed at points along the initial solution path according to any suitable interval, including intervals which are smaller or larger than the interval between nodes of the graph.

Figure 12:
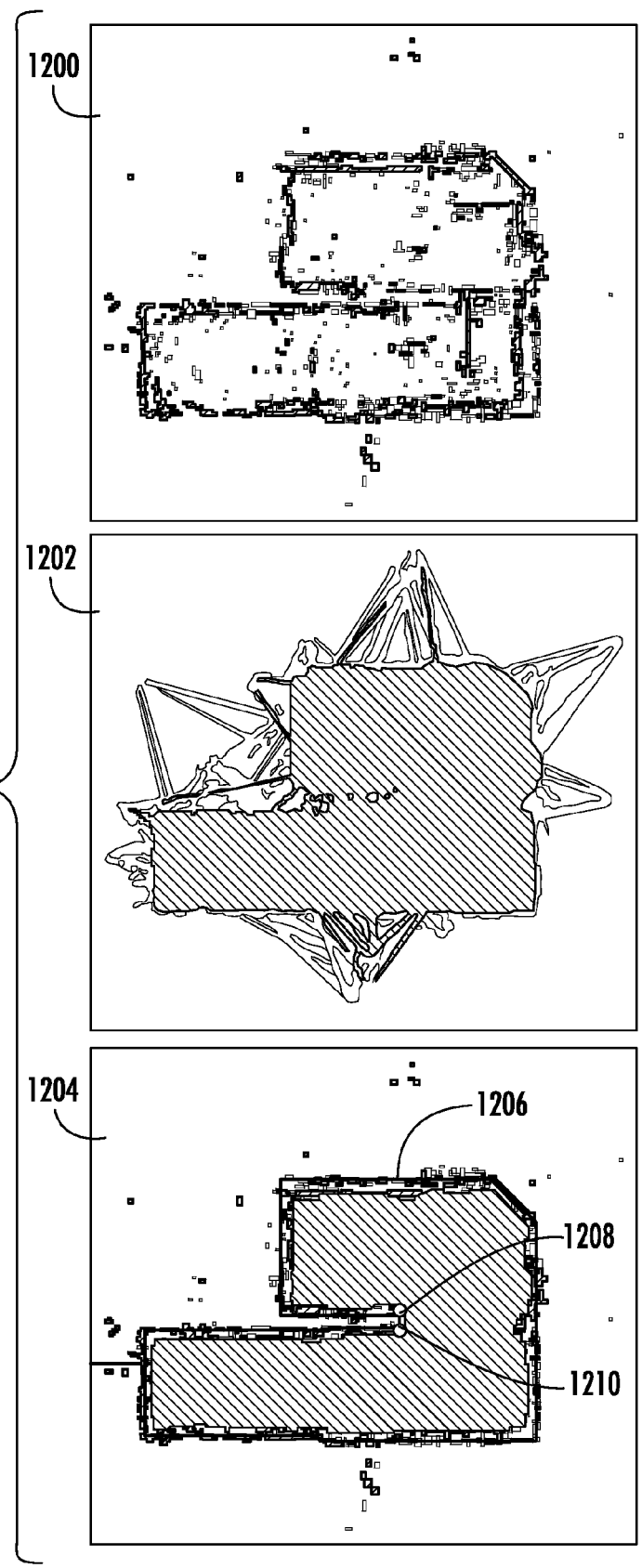
FIG. 12 depicts exemplary two-dimensional solution spaces and an exemplary free-space evidence map according to an exemplary embodiment of the present disclosure.

As an example, FIG. 12 depicts exemplary two-dimensional solution spaces 1200 and 1204 and an exemplary free-space evidence map 1202 according to an exemplary embodiment of the present disclosure. Two-dimensional solution space 1200 can be generated by filtering a three-dimensional point cloud and then projecting such point cloud onto a ground plane. Free-space evidence map 1202 can describe a free-space value for each pixel of two-dimensional solution space 1200. Each free-space value can reflect an amount of accumulated evidence that the associated pixel is located in the interior of the building. Thresholding can be applied to free-space evidence map 1202 in order to determine a core region of two-dimensional solution space 1204.

More particularly, however, FIG. 12 depicts supplemental anchor nodes 1208 and 1210 on two-dimensional solution space 1204. Supplemental anchor nodes 1208 and 1210 can have been added following the determination of an initial solution path which left a large number of unexplained pixels. For example, supplemental anchor nodes 1208 and 1210 can respectively be the least proximate of a significant number of proximal unexplained pixels for two solution-nodes of the initial solution path. As a result, supplemental anchor nodes 1208 and 1210 can be added or otherwise designated with respect to two-dimensional graph 1204.

Determining a second or subsequent solution path that minimizes the cost formula and is constrained to visit each of the supplemental anchor nodes in addition to the initial anchor node can result in subsequent solution path 1206. Thus, subsequent solution path 1206 accounts for or explains the thin wall apparent in the data. In such fashion, the tendency of the shortest path problem to ignore thin walls can be ameliorated.

Exemplary Addition to Core Region

Another aspect of the present disclosure combats the shrinkage bias that results from having an incomplete core region. In particular, a minimum spanning-tree can be generated that spans the pixels associated with all known data capture locations, such as, for example, panorama optical centers. The spanning-tree can then be added to the core region. Because the shortest path must circumnavigate the core region, the shortest path must therefore circumnavigate the minimum spanning tree and all panorama centers. In such fashion, shrinkage bias can be reduced.

Figure 13:
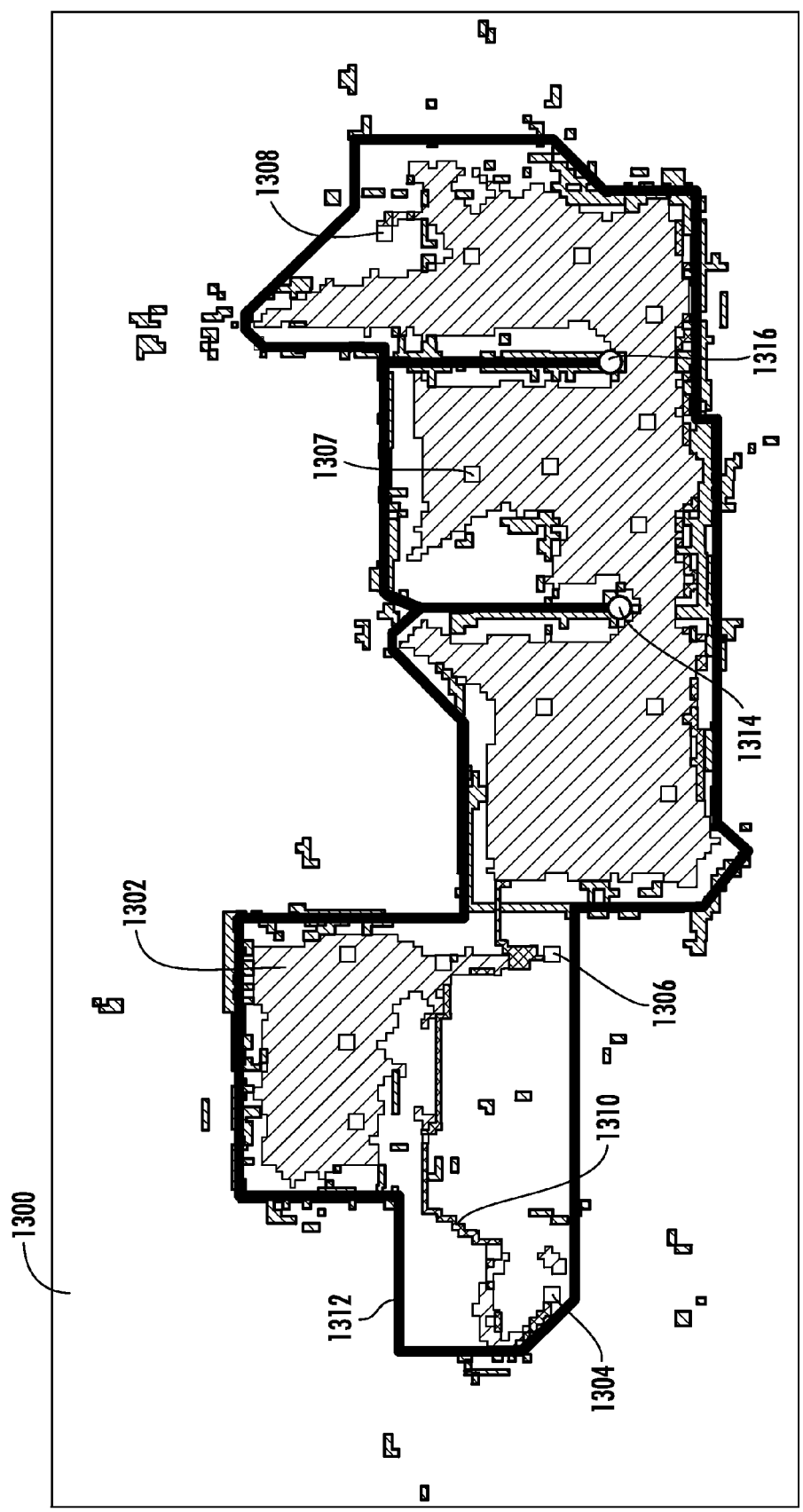
FIG. 13 depicts an exemplary two-dimensional solution space according to an exemplary embodiment of the present disclosure.

For example, FIG. 13 depicts an exemplary two-dimensional solution space 1300 according to an exemplary embodiment of the present disclosure. In particular, two-dimensional solution space 1300 includes pixels respectively associated with a plurality of data capture locations. For example, exemplary pixels 1304, 1306, 1307, and 1308 are respectively associated with a plurality of data capture locations. As an example, pixels 1304, 1306, 1307, and 1308 can be associated with optical centers of panoramic images. Such panoramic images can have been used to generate two-dimensional graph 1300.

A minimum spanning tree 1310 can span each pixel associated with a data capture location, including pixels 1304, 1306, 1307, and 1308. The evidence values associated with the pixels of two-dimensional graph 1300 can form the basis for determining minimum spanning tree 1310. One of skill in the art will appreciate that minimum spanning tree 1310 spans each pixel associated with a data capture location, but is only depicted in locations where core region 1302 is not also present.

Minimum spanning tree 1310 can be added to or be made part of core region 1302. Therefore, solution path 1312 is constrained to circumnavigate all pixels associated with optical centers, including, for example, pixel 1304.

Also depicted in FIG. 13 are supplemental anchor nodes 1314 and 1316. Supplemental anchor nodes 1314 and 1316 can have been determined based on the methods discussed with respect to FIG. 12. Through the addition of supplemental anchor nodes 1314 and 1316, the thin walls apparent from the data can be recovered or explained by solution path 1312.

Exemplary Methods for Generating a Three-Dimensional Model

Figure 14:
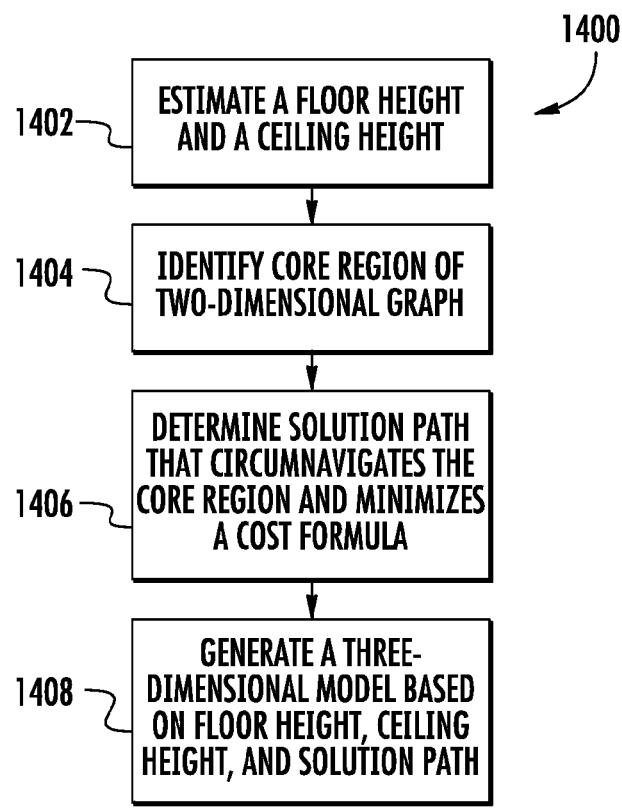
FIG. 14 depicts a flowchart of an exemplary method for generating a three-dimensional model of a building.

FIG. 14 depicts a flowchart of an exemplary method (1400) for generating a three-dimensional model of a building. Method (1400) can be implemented using any suitable computing system, including a computing system having a memory and a processor. In addition, although FIG. 14 depicts steps performed in a particular order for purposes of illustration and discussion, methods of the present disclosure are not limited to such particular order or arrangement. One skilled in the art, using the disclosures provided herein, will appreciate that various steps of the method (1400) can be omitted, rearranged, combined, and/or adapted in various ways without deviating from the scope of the present disclosure.

At (1402) a floor height and a ceiling height of the interior of a building are estimated. For example, the floor height and the ceiling height can be estimated based on data generated from panoramic images, standard frame images, laser scan data, or other depth sensor data.

At (1404) a core region of a two-dimensional graph can be identified. As an example, a two-dimensional solution space can be generated by projecting a three-dimensional point cloud onto a ground plane. A core region of the two-dimensional solution space can be identified by thresholding a free-space evidence map describing, for each pixel of the two-dimensional solution space, an amount of accumulated evidence that such pixel is within the interior of the building. The core region of the two-dimensional graph can be the nodes associated with the pixels identified by such thresholding.

At (1406) a solution path that circumnavigates the core region and minimizes a cost formula can be determined. For example, the determination of the solution path can be posed as a shortest path problem in which a solution path must start at an initial anchor node, circumnavigate the core region identified at (1404), and return to the initial anchor node.

At (1408) a three-dimensional model of the interior of the building can be generated based on the floor height, the ceiling height, and the solution path. For example, the shape of the solution path can be extruded to the floor height and ceiling height estimated at (1402).

Figure 15:
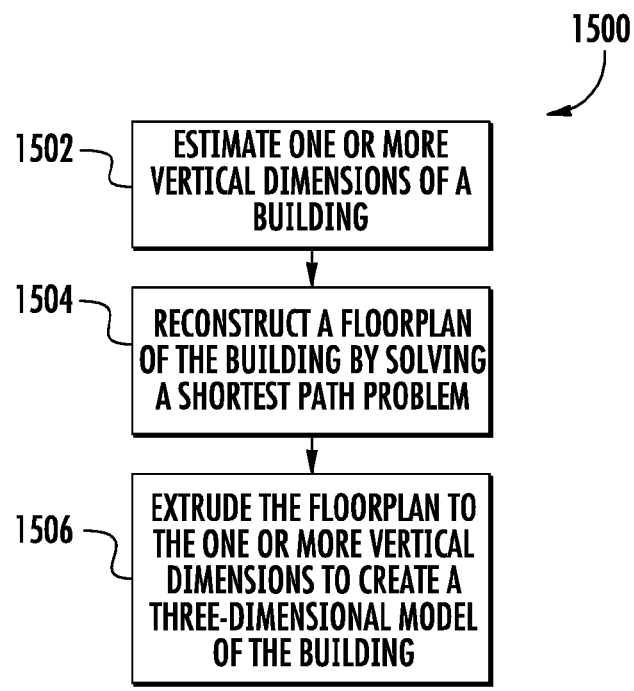
FIG. 15 depicts a flowchart of an exemplary method for generating a three-dimensional model of a building.

FIG. 15 depicts a flowchart of an exemplary method (1500) for generating a three-dimensional model of a building. Method (1500) can be implemented using any suitable computing system, including a computing system having a memory and a processor. In addition, although FIG. 15 depicts steps performed in a particular order for purposes of illustration and discussion, methods of the present disclosure are not limited to such particular order or arrangement. One skilled in the art, using the disclosures provided herein, will appreciate that various steps of the method (1500) can be omitted, rearranged, combined, and/or adapted in various ways without deviating from the scope of the present disclosure.

At (1502) one or more vertical dimensions of a building can be estimated. As an example, a floor height and a ceiling height of the building can be estimated.

At (1504) a floorplan of the building can be reconstructed by solving a shortest path problem. For example, the shortest path problem can be posed on a two-dimensional graph including a plurality of edges respectively connecting a plurality of nodes. A shortest path can be determined by selecting and combining three or more of such edges.

At (1506) the floorplan reconstructed at (1504) is extruded to the one or more vertical dimensions estimated at (1502) in order to create a three-dimensional model of the building.

Figure 16A:
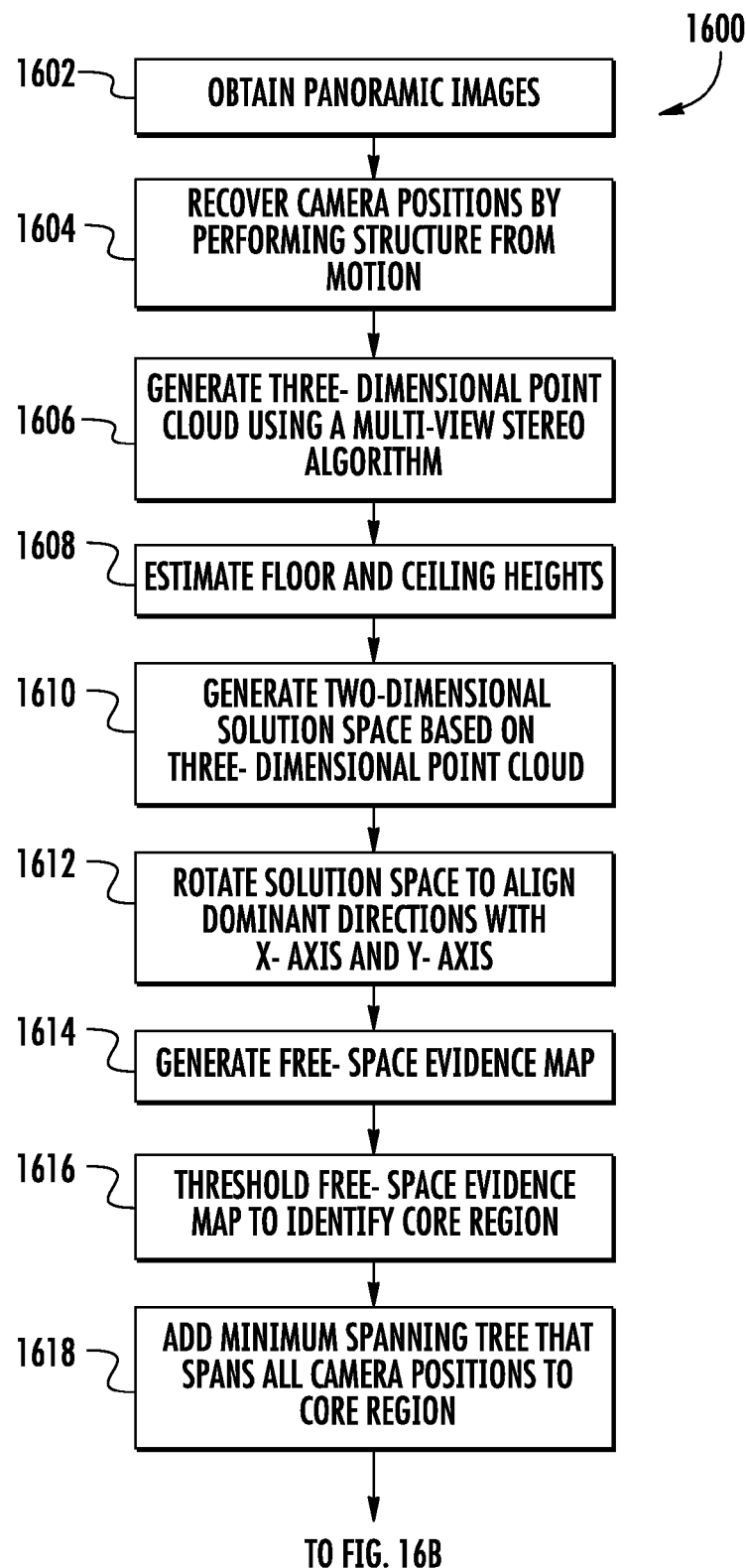
FIGS. 16A and 16B depict a flowchart of an exemplary method for generating a three-dimensional model of a building.

FIG. 16A depicts a flowchart of an exemplary method (1600) for generating a three-dimensional model of a building. Method (1600) can be implemented using any suitable computing system, including a computing system having a memory and a processor. In addition, although FIG. 16 depicts steps performed in a particular order for purposes of illustration and discussion, methods of the present disclosure are not limited to such particular order or arrangement. One skilled in the art, using the disclosures provided herein, will appreciate that various steps of the method (1600) can be omitted, rearranged, combined, and/or adapted in various ways without deviating from the scope of the present disclosure.

At (1602) a plurality of panoramic images are obtained. For example, a plurality of panoramic images of the interior of a building can be obtained. Each panoramic image can be constructed from a plurality of photographs captured from the same location.

At (1604) camera positions of the panoramic images are captured by performing a structure from motion algorithm. For example, the camera positions can be the optical centers of the panoramic photographs obtained or created at (1602).

At (1606) a three-dimensional point cloud is generated using a multi-view stereo algorithm. For example, the PMVS algorithm can reconstruct dense, oriented points based on the panoramic images obtained at (1602). Each point can be associated with a three-dimensional location, have a surface normal, and be associated with two or more panoramic images in which such point was located. In particular, each point can have a confidence value indicating the number of panoramic images in which such point was located.

At (1608) a floor height and a ceiling height are estimated. For example, the floor and ceiling height can be estimated by analyzing the three-dimensional point cloud generated at (1606). As another example, the floor and ceiling height can be estimated by sweeping a horizontal plane through three-dimensional space, projecting the panoramic images onto the plane at each height, and determining the heights at which textural consistency is maximized.

At (1610) a two-dimensional solution space is generated based on the three-dimensional point cloud generated at (1606). For example, the three-dimensional point cloud generated at (1606) can be filtered based on orientation and then projected onto a ground plane such that each point of the point cloud is mapped to a pixel of the two-dimensional solution space. In particular, each pixel of the two-dimensional solution space can have an evidence value describing an amount of evidence projected onto such pixel.

At (1612) the two-dimensional solution space generated at (1610) is rotated in order to align dominant directions evidenced in the data with traditional notions of x and y axes.

At (1614) a free-space evidence map is generated. The free-space evidence map can describe, for each pixel of the two-dimensional solution space generated at (1610), an amount of accumulated evidence that such pixel is within the interior of the building. For example, a free-space value of a pixel can be incremented for each instance in which such pixel lies between a pixel associated with a point of the three-dimensional cloud and a pixel associated with the optical center of a panoramic image in which such point was identified.

At (1616) the free-space evidence map generated at (1614) is thresholded in order to identify a core region of the two-dimensional solution space generated at (1610). For example, all pixels with a free-space evidence value greater than a threshold value can be identified as the core region.

At (1618) a minimum spanning tree that spans pixels associated with all camera positions can be determined and added to the core region. For example, a plurality of pixels can be respectively associated with the plurality of camera positions recovered at (1604). A minimum spanning tree can connect each of such pixels. In particular, the minimum spanning tree can be determined based on the evidence values of the pixels of the two-dimensional solution space. Such spanning tree can be added to the core region.

Figure 16B:
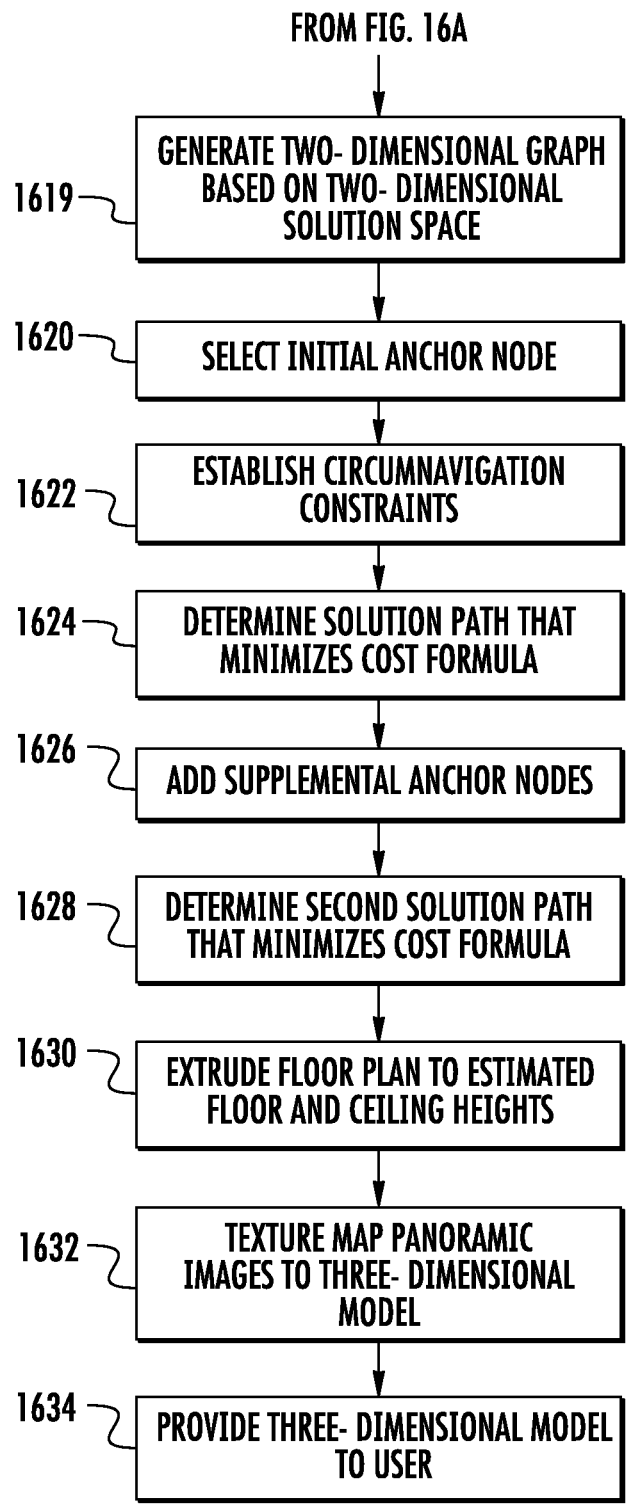

Referring now to FIG. 16B, at (1619) a two-dimensional graph can be generated based on the two-dimensional solution space generated at (1610). In particular, each pixel of the two-dimensional solution space can be treated as a node in the two-dimensional graph. A plurality of edges can respectively connect the plurality of nodes. The plurality of edges can include edges connecting every pair of nodes linearly connectable without crossing the core region.

At (1620) an initial anchor node can be selected. For example, the initial anchor node can be the starting and ending point for a solution path that circumnavigates the core region. The initial anchor node can be selected based on a plurality of factors but generally should be associated with a pixel that has a relatively large evidence value.

At (1622) circumnavigation constraints can be established. For example, a constraint line can be drawn from the core region identified at (1616) through the initial anchor node selected at (1620) to the boundary of the two-dimensional graph. A solution can be constrained such that it does not cross the constraint line.

At (1624) a solution path that minimizes a cost formula can be determined. For example, the cost formula can provide a plurality of edge costs for the plurality of edges included in the two-dimensional graph generated at (1619). The plurality of edges can connect each pixel of the two-dimensional graph with any other pixel of the two-dimensional graph so long as the edge does not cross the core region. The edge cost for each edge can be inversely proportional to an amount of evidence traversed by such edge and can include a fixed constant.

The solution path can start at the initial anchor node selected at (1620), circumnavigate the core region identified at (1616) and return to the initial anchor node. The solution path that minimizes the cost formula can be determined using a suitable shortest path algorithm.

At (1626) supplemental anchor nodes can be added to the two-dimensional graph generated at (1619). Supplemental anchor nodes can force the solution path to account for thin walls. For example, when the number of proximal unexplained pixels for a given solution-node is greater than a threshold number, then the least proximate of such proximal unexplained pixels can be designated as a supplemental anchor node.

At (1628) a second solution path that minimizes the cost formula and visits all anchor nodes can be determined. For example, the second solution path can be determined in the same fashion as the solution path determined at (1624) except that the second solution path is constrained to visit the supplemental anchor nodes added at (1626) in addition to the initial anchor node.

At (1630) a floorplan is extruded to the floor and ceiling heights estimated at (1608). For example, the shape of the second solution path determined at (1628) can be extended vertically to the estimated floor and ceiling heights to generate a three-dimensional mesh model.

At (1632) the panoramic images obtained at (1602) can be texture mapped to the three-dimensional model generated at (1630). For example, one panoramic image can be used to texture map each wall of the three-dimensional mesh model. As another example, the texture mapping of the panoramic photographs to the three-dimensional model can be view-dependent such that step (1632) is repeated for each instance in which a user requests a different view of the three-dimensional model.

At (1634) the three-dimensional model is provided to a user. For example, a user can view the three-dimensional model using a viewing or visualization software or module.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for generating a three-dimensional model of a building, the method comprising:
   estimating, by one or more computing systems, a floor height and a ceiling height of the building;
   identifying, by one or more computing systems, a core region of a two-dimensional graph, the core region corresponding to an interior of the building;
   determining, by one or more computing systems, a solution path that circumnavigates the core region and minimizes a cost formula, the cost formula providing an edge cost for each of a plurality of edges, wherein each edge cost includes a fixed constant that biases the solution path towards fewer edges overall; and
   generating, by one or more computing systems, a three-dimensional model of the interior of the building based on the floor height, the ceiling height, and the solution path.

2. The computer-implemented method of claim 1, further comprising obtaining a three-dimensional point cloud comprising a plurality of evidence points, the two-dimensional graph being based on the three-dimensional point cloud.

3. The computer-implemented method of claim 2, wherein identifying a core region of a two-dimensional graph comprises:
   projecting the three-dimensional point cloud onto a two-dimensional solution space comprising a plurality of pixels;
   identifying a core region of the two-dimensional solution space; and
   generating the two-dimensional graph based on the two-dimensional solution space, the two-dimensional graph comprising a plurality of nodes respectively connected by the plurality of edges, each node of the two-dimensional graph corresponding to a pixel of the two-dimensional solution space.

4. The computer-implemented method of claim 3, wherein each pixel of the two-dimensional solution space has an evidence value equal to the number of evidence points projected onto such pixel.

5. The computer-implemented method of claim 3, wherein:
   each evidence point has a confidence value describing a number of panoramic images in which such evidence point was identified; and
   each pixel of the two-dimensional solution space has an evidence value equal to the sum of the confidence values associated with all evidence points associated with such pixel.

6. The computer-implemented method of claim 3, wherein identifying the core region of the two-dimensional solution space comprises:
   generating a free-space evidence map describing a free-space value for each pixel of the two-dimensional solution space, the free-space value for each pixel being proportional to an amount of accumulated evidence that such pixel corresponds to the interior of the building; and
   selecting as the core region all pixels with free-space values greater than a threshold value.

7. The computer-implemented method of claim 6, wherein:
   each evidence point of the three-dimensional point cloud corresponds to wall evidence captured from one or more data capture locations; and
   generating the free-space evidence map comprises:
      casting, with respect to the two-dimensional solution space, for each evidence point in the three-dimensional point cloud, one or more rays respectively connecting the pixel associated with such evidence point to the one or more pixels respectively associated with the one or more data capture locations from which the wall evidence corresponding to the such evidence point was captured; and
      incrementing the free-space value for each pixel of the two-dimensional solution space with respect to each instance in which such pixel is traversed by one of the rays.

8. The computer-implemented method of claim 6, wherein:
   the three-dimensional point cloud is obtained from data captured at a plurality of data capture locations; and
   identifying the core region of the two-dimensional solution space further comprises adding a minimum spanning tree to the core region, the minimum spanning tree connecting a plurality of pixels respectively associated with the plurality of data capture locations.

9. The computer-implemented method of claim 1, wherein estimating a floor height and a ceiling height of the building comprises:
   projecting, at each of a plurality of candidate heights in three-dimensional space, two or more images onto a horizontal plane;
   identifying, at each of the plurality of candidate heights, a number of positions where one or more textures contained in the two or more images are consistent;
   selecting as the floor height the candidate height located below a camera height and exhibiting the largest number of positions where one or more textures are consistent; and
   selecting as the ceiling height the candidate height located above the camera height and exhibiting the largest number of positions where one or more textures are consistent.

10. The computer-implemented method of claim 3, wherein:
    each of the plurality of evidence points comprises a patch including a normal describing an estimated orientation of such patch; and
    each edge cost for each edge of the plurality of edges includes a fixed positive constant and is inversely proportional to the total number of patches associated with all nodes traversed by such edge that have normals generally perpendicular to such edge and pointing towards the core region.

11. The computer-implemented method of claim 1, wherein the two-dimensional graph comprises a plurality of nodes and the plurality of edges comprises edges connecting every pair of nodes of the two-dimensional graph that is linearly connectable without traversing the core region.

12. The computer-implemented method of claim 1, wherein:
    the two-dimensional graph comprises a plurality of nodes; and
    determining a solution path that circumnavigates the core region and minimizes a cost formula comprises:
       selecting an initial anchor node; and
       determining a solution path that starts at the initial anchor node, circumnavigates the core region, and returns to the initial anchor node by selecting a plurality of solution edges from the plurality of edges such that the cost formula is minimized.

13. The computer-implemented method of claim 12, further comprising, after determining the solution path but prior to generating the three-dimensional model:

determining, for each node traversed by the solution path, whether the number of proximal unexplained pixels is greater than a threshold number, unexplained pixels being pixels of the two-dimensional solution space that are interior to the solution path, are not within the core region, and have a non-zero evidence value;

designating, for each node traversed by the solution path that has a greater number of proximal unexplained pixels than the threshold number, the least proximate of such unexplained pixels as a supplemental anchor node; and determining a revised solution path that starts at the initial anchor node, circumnavigates the core region while visiting any supplemental anchor nodes, and returns to the initial anchor node by selecting a second plurality of solution edges from the plurality of edges such that the cost formula is minimized;

wherein the three-dimensional model of the interior of the building is generated based on the floor height, the ceiling height, and the revised solution path.

14. The computer-implemented method of claim 2, wherein obtaining a three-dimensional point cloud comprises performing a multi-view stereo algorithm with respect to a plurality of panoramic images, the method further comprising, prior to determining the solution path:

determining two or more dominant directions by extracting line segments from the plurality of panoramic images;

wherein the plurality of edges includes only edges that are generally aligned with the two or more dominant directions.

15. A non-transitory, computer-readable medium storing instructions that, when executed by at least one processor, cause the at least one processor to perform operations comprising:

identifying a core region of a two-dimensional solution space, the two-dimensional solution space comprising a plurality of pixels describing data associated with a structure, each pixel having an evidence value describing an amount of evidence that an element of the structure is located at a position associated with such pixel;

generating, based on the two-dimensional solution space, a two-dimensional graph comprising a plurality of nodes respectively connected by a set of candidate edges; and determining a solution path that circumnavigates the core region and minimizes a cost formula, the cost formula providing an edge cost for each of the set of candidate edges, wherein each edge cost includes a fixed constant that biases the solution path towards fewer edges overall.

16. The non-transitory, computer-readable medium of claim 15, wherein:

each node of the two-dimensional graph corresponds to one of the plurality of pixels of the two-dimensional solution space; and the edge cost associated with each edge is inversely proportional to the sum of the evidence values of the pixels associated with all nodes traversed by such edge.

17. The non-transitory, computer-readable medium of claim 15, wherein the set of candidate edges connects every pair of nodes that is connectable without traversing the core region.

18. The non-transitory, computer-readable medium of claim 15, wherein each edge cost associated with each edge includes a positive constant value.

19. The non-transitory, computer-readable medium of claim 15, wherein identifying the core region of the two-dimensional solution space comprises:

computing a free-space value for each pixel of the two-dimensional solution space, the free-space value for each pixel being proportional to the number of instances in which such pixel lies between a pixel associated with one of a plurality of data capture locations and a pixel associated with evidence data captured from such data capture location; and selecting all pixels with free-space values greater than a threshold value as the core region.

20. The non-transitory, computer-readable medium of claim 19, wherein identifying the core region of the two-dimensional solution space further comprises adding to the core region a minimum spanning tree connecting a plurality of pixels respectively associated with the plurality of data capture locations.

21. The non-transitory, computer-readable medium of claim 15, wherein determining a solution path that circumnavigates the core region and minimizes a cost formula comprises:

selecting an initial anchor node based on the plurality of evidence values respectively associated with the plurality of pixels;

determining a first solution path that starts at the initial anchor node, circumnavigates the core region, returns to the initial anchor node, and minimizes the cost formula;

determining, for each node traversed by the first solution path, whether the number of proximal unexplained pixels is greater than a threshold number, unexplained pixels being pixels that are interior to the solution path, are not within the core region, and have a non-zero evidence value;

designating, for each node traversed by the first solution path that has a greater number of proximal unexplained pixels than the threshold number, the least proximate of such unexplained pixels as a supplemental anchor node; and determining a second solution path that starts at the initial anchor node, circumnavigates the core region, traverses all supplemental anchor nodes, returns to the initial anchor node, and minimizes the cost formula.

22. A computer system comprising a memory and a processor, the system being configured to generate a three-dimensional model of a building by performing operations comprising:

estimating one or more vertical dimensions of the building based on data generated from one of a plurality of panoramic images, a laser range device, or a depth sensor;

reconstructing a floorplan of the building by solving a shortest path problem, the solution to the shortest path problem being required to circumnavigate a core region of a graph, the graph comprising a plurality of nodes and a plurality of edges, the plurality of edges connecting each node of the graph with all other nodes of the graph linearly connectable from such node without traversing the core region; and extruding the floorplan to the one or more vertical dimensions to generate the three-dimensional model of the building;

wherein a plurality of edge costs are respectively associated with the plurality of edges, each edge cost being inversely proportional to an amount of evidence associated with the nodes traversed by such edge, and wherein each edge cost includes a fixed constant that biases the solution path towards fewer edges overall.

23. The computer system of claim 22, wherein each edge cost further includes a positive constant value.

24. The computer system of claim 22, being further configured to perform further operations comprising, prior to reconstructing the floorplan:
- projecting a three-dimensional point cloud onto a two-dimensional solution space comprising a plurality of pixels; and
- generating the graph based on the two-dimensional solution space such that each node of the graph corresponds to one of the plurality of pixels of the two-dimensional solution space.

25. The computer system of claim 24, being further configured to perform further operations comprising, prior to reconstructing the floorplan:
- computing a free-space evidence value for each pixel of the two-dimensional solution space, the free-space evidence value for each pixel describing an amount of accumulated evidence that such pixel corresponds to an interior of the building; and
- selecting as the core region the nodes of the graph that correspond to pixels of the two-dimensional solution space that have a free-space evidence value greater than a threshold value.

* * * * *